US012321146B2

(12) United States Patent
Jasper et al.

(10) Patent No.: US 12,321,146 B2
(45) Date of Patent: Jun. 3, 2025

(54) BACKGROUND DISCOVERY AGENT ORCHESTRATION

(71) Applicant: Rockwell Automation Technologies, Inc., Mayfield Heights, OH (US)

(72) Inventors: Taryl J Jasper, Concord Township, OH (US); Charles M Rischar, Chardon, OH (US); Radek Bartman, Jablonec and Nisou (CZ); Roman Vitek, Prague (CZ)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 354 days.

(21) Appl. No.: 17/819,671

(22) Filed: Aug. 15, 2022

(65) Prior Publication Data

US 2024/0053718 A1 Feb. 15, 2024

(51) Int. Cl.
G05B 19/042 (2006.01)

(52) U.S. Cl.
CPC ............ G05B 19/0428 (2013.01); *G05B 2219/25057* (2013.01)

(58) Field of Classification Search
None
See application file for complete search history.

(56) References Cited

U.S. PATENT DOCUMENTS

| 2016/0380841 | A1 | 12/2016 | Cordray et al. |
| 2017/0017211 | A1 | 1/2017 | Periasamy et al. |
| 2017/0093640 | A1* | 3/2017 | Subramanian ...... H04L 41/5058 |
| 2017/0336947 | A1 | 11/2017 | Bliss et al. |
| 2017/0351226 | A1 | 12/2017 | Bliss et al. |

OTHER PUBLICATIONS

Extended European Search Report received for European Patent Application Serial No. 23183598.4 dated Jan. 3, 2024, 12 pages.

(Continued)

*Primary Examiner* — Ryan A Jarrett
(74) *Attorney, Agent, or Firm* — Amin, Turocy & Watson, LLP

(57) ABSTRACT

An industrial topology discovery system autonomously discovers and documents industrial automation system topologies using orchestrated discovery agents of various types. The topology discovery system can reside on a cloud platform or another high level network and deploy discovery agents on plant networks and devices within an industrial facility. These discovery agents can implement different strategies for discovering system information, and can include agents configured to monitor and report on communication traffic across respective types of networks, agents configured to probe respective device types for identity and configuration information, and other types of agents. Discovery services executed by the topology discovery system can collect device and network information obtained by the agents and use this information to document the topology of the automation system as well as to orchestrate the discovery behavior of the agents to extract further information about the system based on defined discovery rules.

20 Claims, 30 Drawing Sheets

(56) References Cited

OTHER PUBLICATIONS

Extended European Search Report received for European Patent Application Serial No. 23186059.4 dated Jan. 29, 2024, 10 pages.
Breitbart et al., "Topology Discovery in Heterogeneous IP Networks", IEEE/ACM Transactions on Networking, vol. 12, No. 3, Jun. 2004, pp. 401-414.
Non-Final Office Action received for U.S. Appl. No. 17/929,070, dated Dec. 27, 2024, 22 pages.

* cited by examiner

INDUSTRIAL ASSET

BACKGROUND DISCOVERY AGENT ORCHESTRATION

TECHNICAL FIELD

The subject matter disclosed herein relates generally to industrial automation systems, and, for example, to documenting industrial control system topologies.

BACKGROUND ART

Industrial asset owners could benefit from accurate inventory documentation for the industrial devices operating within their facilities. Device inventory documentation could be used, for example, as a reference when ordering replacement or backup devices, to create bills of materials for new installations, or for other purposes. Complete system topology information, which documents not only the devices that make up an automation system but also the connections and communication paths between those devices, has even greater utility and could be used for a wider range of applications, including but not limited to risk analysis, security analysis, design documentation, network traffic analysis, or other such applications.

However, since a given automation system can comprise a large heterogeneous collection of devices, as well as many communication paths between devices across various types of networks or communication busses (e.g., Ethernet, Profibus, remote I/O, controller backplanes, etc.), generating accurate and complete system topology information for the automation systems within an industrial enterprise can be prohibitively challenging.

The above-described issues are merely intended to provide an overview of some of the problems of current technology and are not intended to be exhaustive. Other problems with the state of the art, and corresponding benefits of some of the various non-limiting embodiments described herein, may become further apparent upon review of the following detailed description.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for documenting industrial control systems is provided, comprising a discovery component configured to deploy, to devices of an industrial control system, discovery agents configured to discover and collect respective sets of information about the devices and networks of the industrial control system; and an aggregation component configured to receive the sets of information from the discovery agents and generate, based on the sets of information, a topology model of the industrial control system, wherein the discovery agents comprise multiple agent types configured to execute respective different discovery strategies for discovering the sets of information, and the discovery component is configured to deploy and control a first discovery agent configured to execute a first discovery strategy based on a set of information received from a second discovery agent configured to execute a second discovery strategy.

Also, one or more embodiments provide a method, comprising deploying, by a system comprising a processor, discovery agents to devices of an industrial control system, wherein the discovery agents are configured to discover and collect respective sets of information about the devices and networks of the industrial control system, and the discovery agents comprise multiple agent types configured to execute respective different discovery strategies for discovering the sets of information; receiving, by the system, the sets of information submitted by the discovery agents; and generating, by the system based on the sets of information, a topology model of the industrial control system, wherein the deploying comprises deploying and controlling a first discovery agent configured to execute a first discovery strategy based on a set of information received from a second discovery agent configured to execute a second discovery strategy.

Also, according to one or more embodiments, a non-transitory computer-readable medium is provided having stored thereon instructions that, in response to execution, cause a system to perform operations, the operations comprising deploying discovery agents to devices of an industrial control system, wherein the discovery agents are configured to discover and collect respective sets of information about the devices and networks of the industrial control system, and the discovery agents comprise multiple agent types configured to execute respective different discovery strategies for discovering the sets of information; receiving the sets of information submitted by the discovery agents; and generating a topology model of the industrial control system based on the sets of information, wherein the deploying comprises deploying and controlling a first discovery agent configured to execute a first discovery strategy based on a set of information received from a second discovery agent configured to execute a second discovery strategy.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
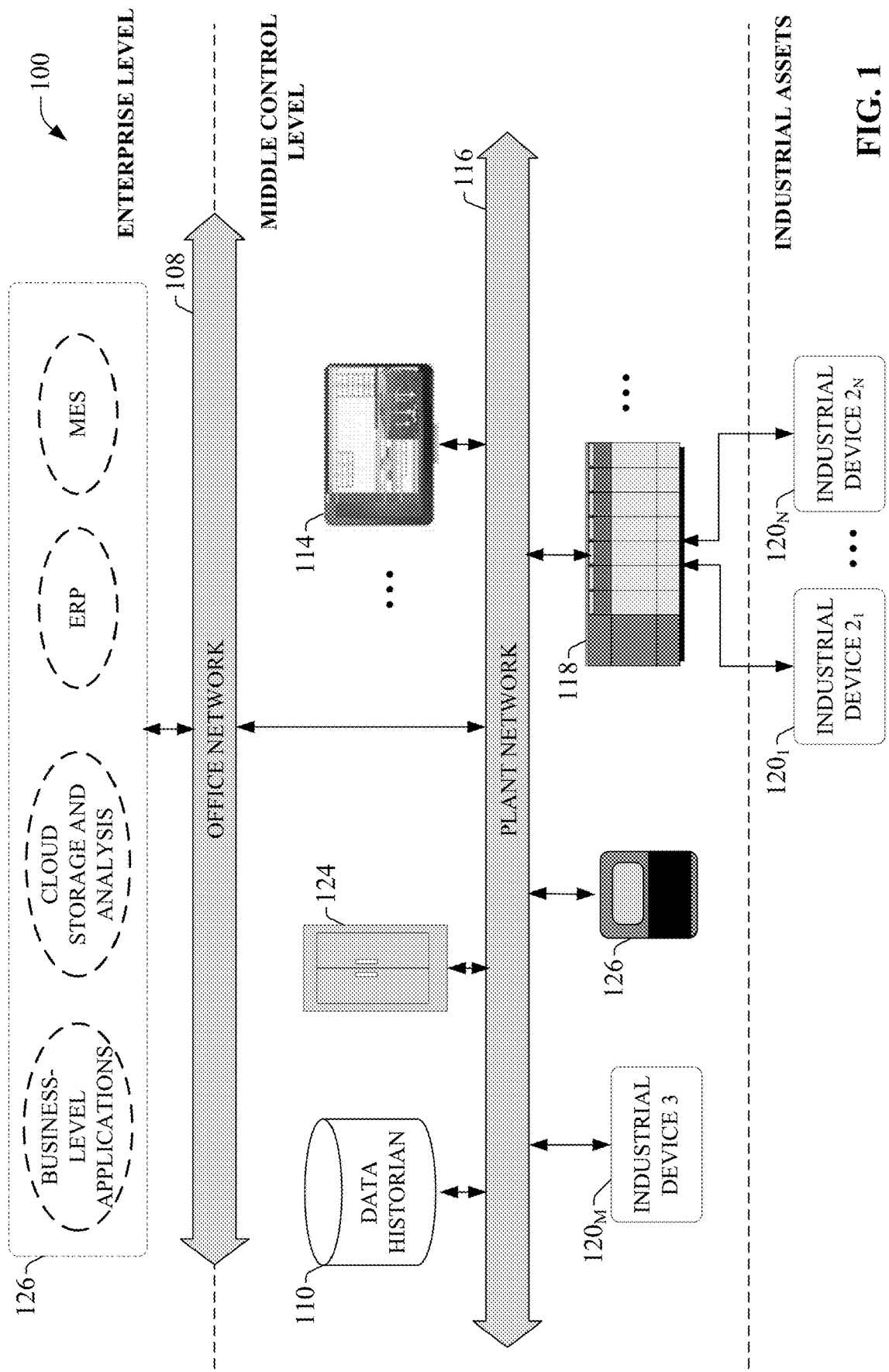
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with networked industrial devices 120M over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, motor control centers 124 that house motor control devices, motor drives such as variable frequency drives 126, vision systems, or other such systems.

Higher-level systems 128 may carry out functions that are less directly related to control of the industrial automation systems on the plant floor, and instead are directed to long term planning, high-level supervisory control, analytics, reporting, or other such high-level functions. These systems 128 may reside on the office network 108 at an external location relative to the plant facility, or on a cloud platform with access to the office and/or plant networks. Higher-level systems 128 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

Industrial asset owners would benefit from maintaining accurate inventories of the industrial devices operating within their facilities. This information could be used as a reference when ordering replacement or backup devices, to create bills of materials for new installations, or for other purposes. Complete system topology information, which documents not only the devices that make up an automation system but also the connections and communication paths between those devices, has even greater utility and could be used for a wider range of applications, including but not limited to risk analysis, security analysis, design documentation, network traffic analysis, or other such applications. However, since a given automation system can comprise a large number of devices of various types, as well as many communication paths between devices across various types of networks or communication busses (e.g., Ethernet, Profibus, remote I/O, controller backplanes, etc.), generating accurate and complete system topology information for the automation systems within an industrial enterprise can be prohibitively challenging.

To address these and other issues, one or more embodiments described herein provide an industrial topology discovery system that autonomously discovers and documents industrial automation system topologies using orchestrated discovery agents of various types. In one or more embodiments, the topology discovery system can reside on a cloud platform or another high level network and can deploy discovery agents on plant networks and devices within an industrial facility. These discovery agents can be configured to implement different strategies for discovering system information, and can include agents configured to monitor and report on communication traffic across respective types of networks (e.g., EthernetIP, Profinet, etc.), agents configured to probe respective device types for identity and configuration information, and other types of agents. Discovery services executed by the topology discovery system can collect device and network information obtained by the agents and use this information to document the topology of the automation system—including the devices that make up the system, the networks and communication busses used for device communication, and the communication paths between pairs of devices within the system—as well as to orchestrate the discovery activities of the agents to extract further information about the system based on defined discovery rules. The topology discovery system can carry out these topology discovery services autonomously on a substantially continuous basis or periodically according to a defined frequency.

Figure 2:
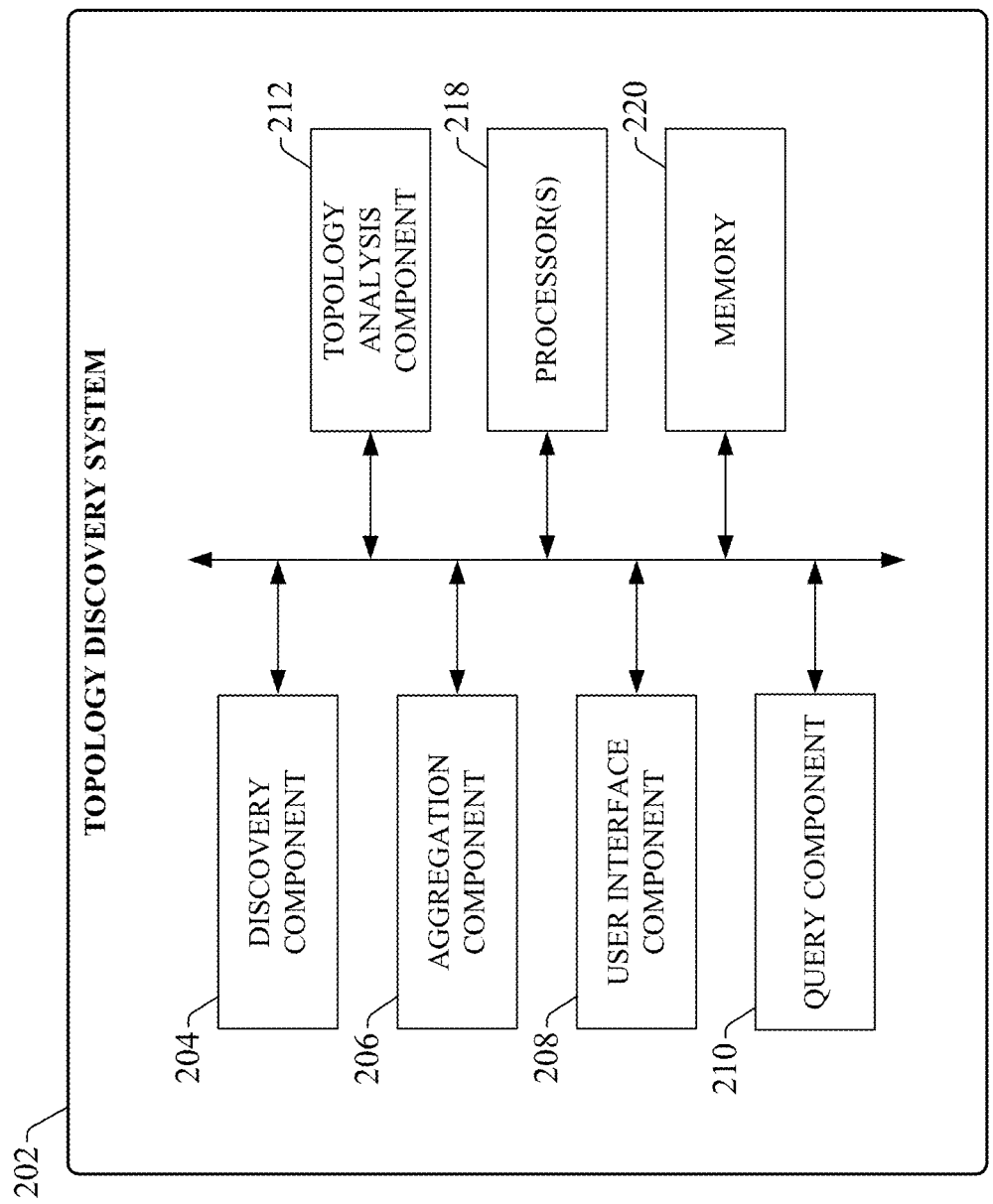
FIG. 2 is a block diagram of an example topology discovery system.

FIG. 2 is a block diagram of an example topology discovery system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Topology discovery system 202 can include a discovery component 204, an aggregation component 206, a user interface component 208, a query component 210, a topology analysis component 212, one or more processors 218, and memory 220. In various embodiments, one or more of the discovery component 204, aggregation component 206, user interface component 208, query component 210, topology analysis component 212, the one or more processors 218, and memory 220 can be electrically and/or communicatively coupled to one another to perform one or more of the functions of the topology discovery system 202. In some embodiments, components 204, 206, 208, 210, and 212 can comprise software instructions stored on memory 220 and executed by processor(s) 218. Topology discovery system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

Discovery component 204 can be configured to deploy discovery agents of various types and functionalities to networks and devices in a plant facility and to orchestrate the discovery behavior of these agents. The agents can collect information from, and about, the networks and devices, including but not limited to information about data traffic across the networks that make up the automation system, the identities and configurations of industrial devices that make up the automation system (e.g., model information, port configurations, network addresses and settings, etc.), and other such information. Discovery component 204 can receive the disparate information about the automation system generated by the agents and update the discovery strategies carried out by the agents based on this information.

Aggregation component 206 can be configured to build a topology model for the automation system based on the diverse sets of information received from the discovery agents. The topology model can document the devices that make up an automation system, available communication paths between devices, types of networks or communication busses over which these communication paths traverse, or other such information.

User interface component 208 can be configured to receive user input and to render output to the user in any suitable format (e.g., visual, audio, tactile, etc.). In some embodiments, user interface component 208 can be configured to communicatively interface with a client device (e.g., a laptop computer, tablet computer, smart phone, etc.) that is communicatively connected to the topology discovery system 202 (e.g., via a hardwired or wireless connection). The user interface component 204 can then receive user input data and render output data via the client device.

Query component 210 can be configured to submit queries for system information to the topology data generated by the aggregation component 206 and return information about the system topology in response to the query. These queries can be submitted by a user or by an application that uses portions of the system topology information in connection with its processing (e.g., risk management applications, security applications, project design applications, etc.).

Topology analysis component 212 can be configured to apply analytics to the topology model generated by the aggregation component 206. Example analytics that can be applied by the topology analysis component 212 can include, for example, risk analysis, security analysis, verification that the automation system design represented by the topology complies with enterprise-specific or industry-specific standards, or other such analysis.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
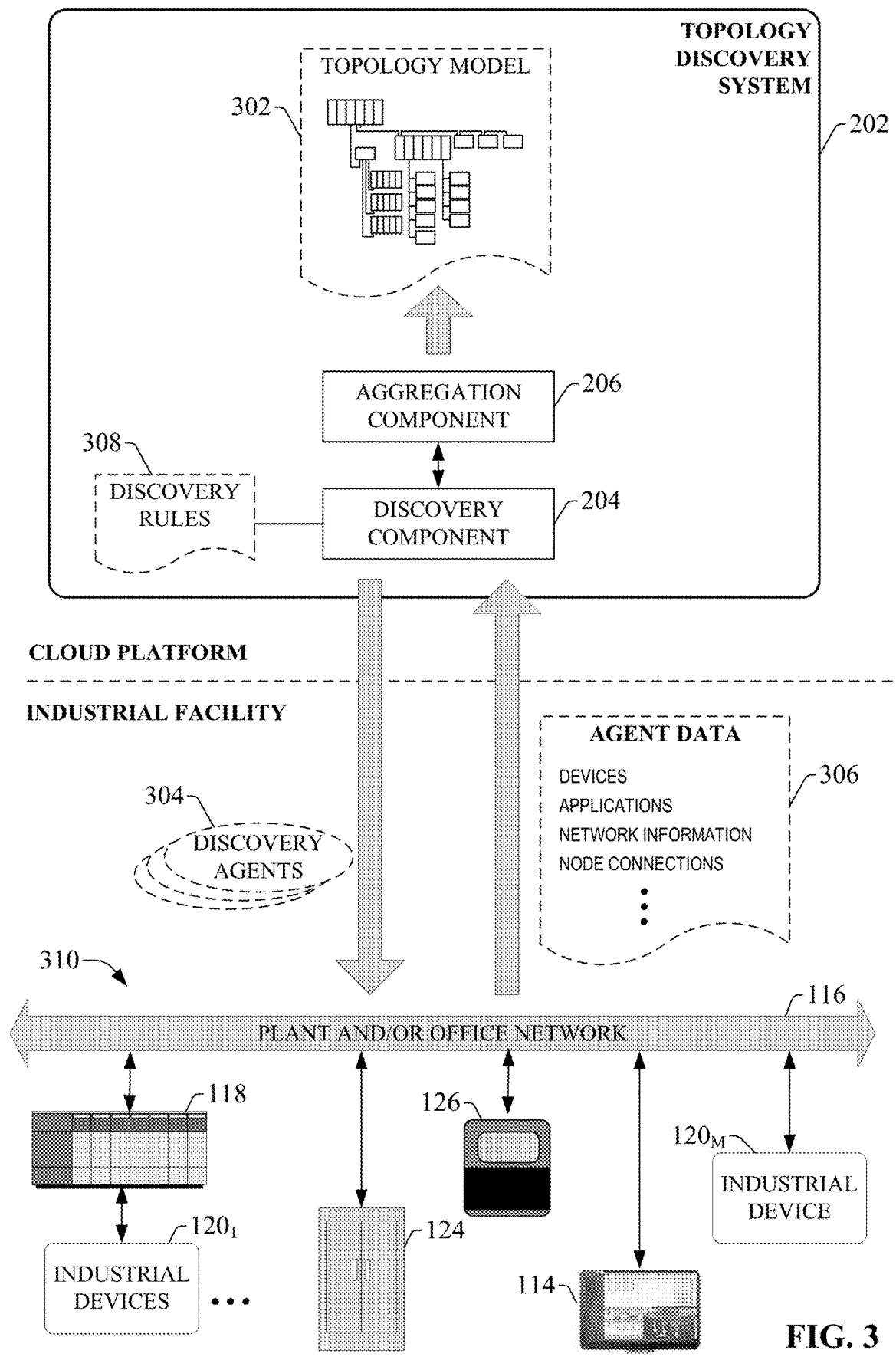
FIG. 3 is a diagram illustrating deployment of discovery agents to an industrial facility and collection of agent data by the topology discovery system.

FIG. 3 is a diagram illustrating deployment of discovery agents 304 to an industrial facility and collection of agent data by the topology discovery system 202 according to one or more embodiments. In this example, the topology discovery system 202 resides on a cloud platform and executes cloud-based discovery services that collect information about automation systems 310 operating within an industrial facility. Based on this collected information, the discovery services build a topology model 302 documenting the devices that make up the automation systems 310 as well as the available communication paths between those devices. To this end, the topology discovery system 202 includes a discovery component 204 that deploys discovery agents 304 to the networks and devices of the automation systems 310 and orchestrates the discovery activities of those agents 304 as new topology information is discovered. Discovery agents 304 are software components that are designed to query for devices or hardware products within the automation systems 310, as well as to query for communication interconnections between the devices, including physical, link, network, and application interconnections. In some scenarios, the agents 304 can be deployed to, and executed on, devices and networks of the automation systems 310, where the agents 304 discover and report information about their host devices and networks. Alternatively, the agents 304 can execute on the topology discovery system 202 itself and remotely probe the devices and networks of the automation system 310 from the cloud platform to obtain information about the identities and configurations of the devices and networks.

The topology discovery system 202 can access the automation systems 310 and their associated devices and networks using any suitable, secure communication path. In an example configuration, the system 202 can access the plant network 116 via an edge device or another type of network infrastructure device, through which the system 202 deploys discovery agents 304 and receives agent data 306 generated by those agents 304. Other communication paths between the plant floor devices and the topology discovery system 202 are also within the scope of one or more embodiments.

The discovery agents 304 operate under the control of the discovery component 204 to gather information about the devices and networks that make up the automation systems 310 and return this discovered information to the discovery component 204 as agent data 306. Agent data 306 can include identity information for industrial devices found in the automation systems 310, including but not limited to industrial controllers 118, local I/O modules connected to the controllers' backplanes, remote I/O modules that communicate with the controllers 118 over remote I/O networks, motor drives or other motor control equipment, HMI terminals 114, telemetry devices (e.g., digital or analog sensors, meters, etc.), quality check systems such as vision systems, or other such devices. Device identity information, which can be discovered by the agents 304 and reported as agent data 306, can include a type of the device (e.g., an industrial controller, and I/O module, a motor drive, a type of telemetry device or smart meter, etc.), a model number of the device, a unique device identifier (e.g., a MAC address), a device vendor identifier, or other such identity information.

In addition to identifying these devices, agent data 306 can also report device configuration information discovered on these discovered devices. This configuration information can include, but is not limited to, network addresses, I/O module configuration data obtained from industrial controllers 118, communication port configuration settings, or other such configuration information which can be used by the system 202 to infer and document topology interconnections.

Discovery agents 304 can also collect and report information about the networks and communication busses over which the discovered devices communicate with one another. To this end, some discovery agents 304 can be configured to discover and identify network infrastructure devices—e.g., routers, hubs, switches, etc.—that act as the communication backbone for networks over which the automation system devices communicate. Some discovery agents 304 can also be configured to monitor data traffic over these networks and report, as agent data 306, statistics about the data traffic, which can be used by the system 202 to infer device communication paths. Other types of information that can be used by the system 202 to infer connections between devices or nodes within the automation systems 310 can also be gathered and reported by the discovery agents 304.

The discovery component 204 can orchestrate the behavior of the discovery agents 304 in accordance with discovery rules 308 defined on the system 202. Discovery rules 308 can define a frequency at which the system 202 executes a discovery sequence on the automation systems 310 (e.g., continuously, once a day, once a week, once a month, etc.). The discovery rules 308 can also include trigger relationships that define conditions under which discovery agents 304 of specified types are to be deployed and how those agents 304 are to be used to gather relevant device or network information. In some cases, the conditions under which an agent 304 is to be deployed can be defined in terms of agent data 306 provided by other agents 304 of other types. Examples of these types of discovery rules 308 will be described in more detail below.

In general, different device types and network technologies require different techniques for discovering information about those devices and networks. For example, the protocols used to query an industrial controller for information that can be used to learn segments of the system topology may be different than the protocols used to query a variable frequency drive or other device types for similar information. Moreover, different device types may contain different types of information relevant to topology discovery. An industrial controller's configuration information, for example, may contain information not only about its own identity, but also about the I/O modules connected to the controller's backplane or remote I/O networks, as well as information about the input or output devices connected to those I/O modules. An HMI terminal executing an HMI application may contain information about its own identity as well as port configuration information specifying the identity of an industrial controller connected to the HMI terminal's communication port. A network infrastructure device, such as a network switch or hub, may contain whitelist data that can be used to identify devices that are permitted to access a given network.

Similarly, different techniques may be required to obtain useful topology data from different network or communication bus types. For example, different network monitoring protocols may be required to obtain data traffic information from an ethernet network than those used to obtain similar information from a profibus network. Moreover, even in the case of a single network protocol, there may be multiple approaches for obtaining information about the devices on that network and the traffic across the network. For example, an ethernet network can be examined by passively listening of the data traffic across the network, or by actively polling network addresses across the network and obtaining responses from available devices.

Given the various discovery strategies required to obtain useful topology information from a heterogeneous collection of devices and networks, the discovery component 204 can deploy and orchestrate multiple types of discovery agents 304, where each type of discovery agent 304 is configured to execute a specific type of discovery strategy. In general, a given type of discovery agent 304 is configured to implement a specific strategy for discovering system information. The strategy carried out by a given type of discovery agent 304 may be specific to a type of device (e.g., industrial controllers, HMI terminals, variable frequency drives, I/O modules, network routers, etc.), a type of network or communication protocol (e.g., Ethernet, Devicenet, Profinet, Fieldbus, etc.), an equipment vendor whose devices support a proprietary communication protocol or data schema, or other such classifications. Different discovery agents 304 may also be configured to carry out respective different types of discovery strategies on the same type of device or network (e.g., passive monitoring versus active polling).

The discovery rules 308 can define trigger relationships between these various types of discovery agents 304, which are used by the discovery component 204 to orchestrate the activities of the agents 304 in order to gain knowledge about automation system topology. For example, the discovery rules 308 may specify that a discovery made by a first type of discovery agent 304 is to trigger deployment of a second type of discovery agent 304 to obtain more detailed information relating to the initial discovery.

Figure 4:
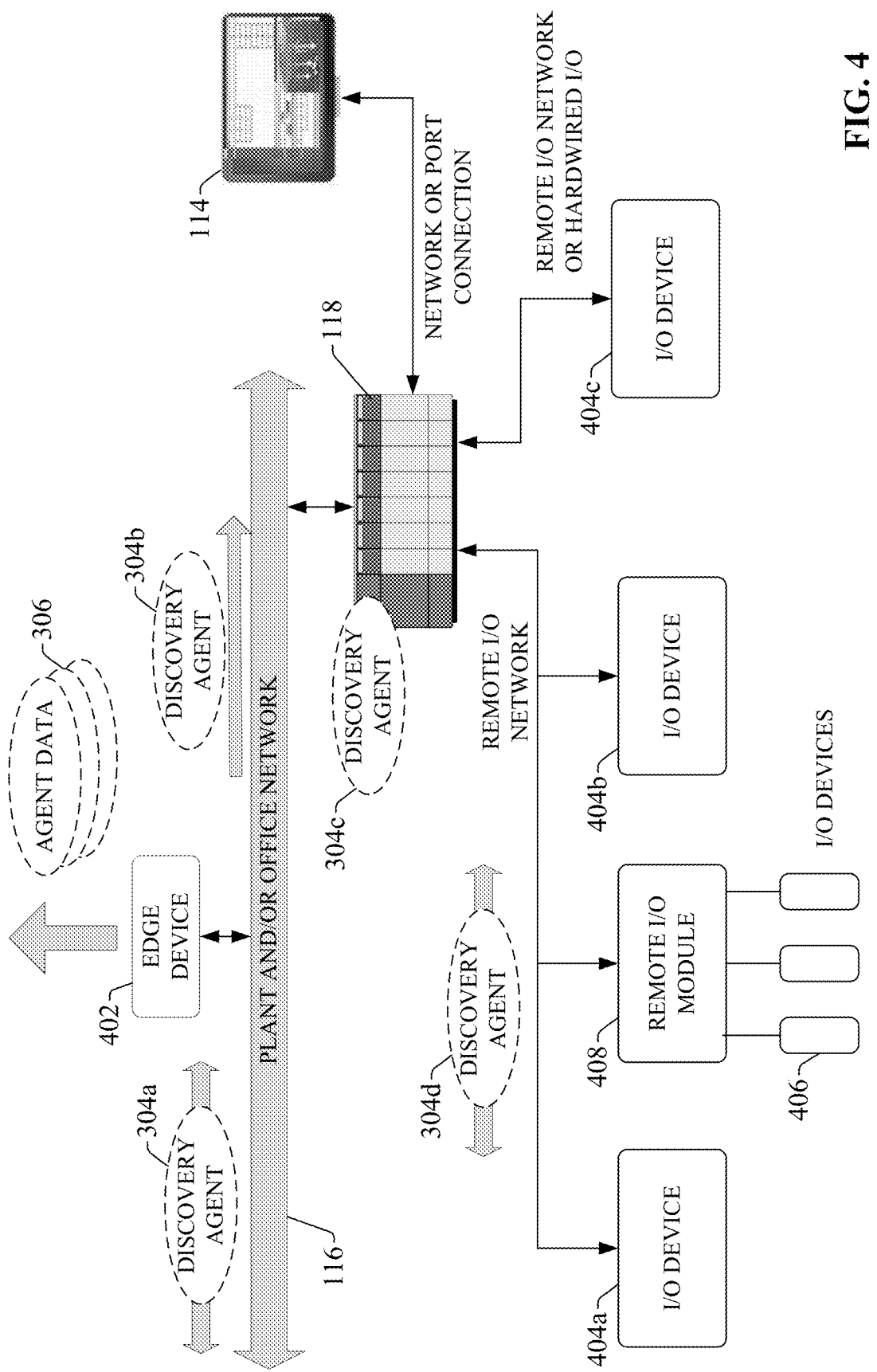
FIG. 4 is a diagram illustrating deployment of various types of discovery agents to a segment of an example automation system comprising multiple types of devices, networks, and communication busses.

FIG. 4 is a diagram illustrating deployment of various types of discovery agents 304 to a segment of an example automation system comprising multiple types of devices, networks, and communication busses. In this example scenario, a first discovery agent 304a configured to passively monitor data traffic on a plant network 116 (e.g., an EthernetIP network) can be deployed by the discovery component 204. Based on the monitored network traffic—e.g., based on examination of data packets being exchanged over the network 116—this discovery agent 304a can discover the presence of an active device (controller 118) on the network 116 as well as the network address of the device. Discovery agent 304a provides this information to the topology discovery system 202 as agent data 306 (via an edge device 402 in this example).

In response to this discovery, and in accordance with the trigger relationships defined by the discovery rules 308, the discovery component 204 can deploy a second discovery agent 304b configured to poll network addresses on the network 116 for device information. The type of discovery agent 304b deployed to perform this task may depend on the type of network 116 on which the active device address is discovered (e.g., Ethernet, Profinet, etc.), since different types of networks may require different polling protocols for their associated devices.

This second discovery agent 304b can actively poll the discovered network address for device identity information. In response, the polled device—industrial controller 118 in this example—may provide information regarding its device type, vendor, MAC address, firmware versions, available data ports, or other such information available on the device. Discovery agent 304b sends this device information to the topology discovery system 202 as agent data 306. The discovery rules 308 may specify that, when an industrial controller 118 is discovered by discovery agent 304b, the controller's configuration data should be examined to discover other devices that may be connected to the controller's I/O. Based on this trigger relationship, the discovery component 204 deploys a third type of discovery agent 304 configured to read and report the controller's I/O configuration data, as well as the configuration of any other data ports integrated in the controller 118. The type of discovery agent 304c deployed to execute this discovery strategy may depend on the vendor or model of the industrial controller 118, since this may dictate the information that is available on the controller 118, a schema of the controller's configuration data, or communication protocols supported by the controller 118.

Based on examination of the controller's configuration information, discovery agent 304c may learn that the controller 118 has at least one local I/O module installed on its backplane (e.g., a digital or analog input or output module), and that an industrial device 404c—e.g., an input device such as a sensor, or an output device such as a motor contactor—is connected to one of the module's I/O points via a hardwired connection. The discovery agent 304c may also learn that the controller 118 also has a remote I/O adapter installed on its backplane, which networks the controller 118 to various remote I/O devices (e.g., devices 404a and 404b) as well as a remote I/O module 408 over a remote I/O network. The controller's configuration information may also include configuration data for another communication port on the controller 118 configured to communicate with an HMI terminal 114. The discovery agent 304c reports these various configuration aspects to the topology discovery system 202 as agent data 306.

Since discovery agent 304c reported that the controller 118 has an associated remote I/O network, which may support a different communication protocol than the plant network 116, the discovery component 204 may deploy another type of discovery agent 304d configured to poll devices on the remote I/O network (e.g., devices 404a and 404b, as well as remote I/O module 408) for their identities and configurations. This discovery agent 304d can execute on any devices from which information about the remote I/O devices can be obtained, including but not limited to the industrial controller 118 or the remote I/O devices 404a, 404b and remote I/O module 408 themselves. Discovery agent 304d can obtain identity and configuration information from the remote I/O devices 404a, 404b—e.g., device types, model numbers, vendors, network addresses, etc.—and report this information to the topology discovery system 202 as agent data 306. Similar information can be collected from the remote I/O module 408.

In addition, based on the discovery of the remote I/O module 408, which interfaces a number of other remote I/O devices 406 to the controller 118, the discovery agent 304d (or another type of discovery agent 304 suitable for the task) can read the remote I/O module's configuration data to learn the identities of the remote I/O devices 406 connected to the remote I/O module 408, and report this information to the system 202 as agent data 306. Also, based on configuration information for the industrial controller's communication port indicating that the controller 118 is configured to exchange data with HMI terminal 114, the discovery agent 304c may report the presence of HMI terminal 114 on the controller's communication port to the topology discovery system 202 as agent data 306.

The scenario depicted in FIG. 4 illustrates collection of topology data for a single segment of an overall automation system topology. The discovery component 204 can deploy and orchestrate discovery agents 304 across the entire topology of an automation system within an industrial facility in this manner based on agent trigger relationships defined by the discovery rules 308. Each type of discovery agent 304 can be configured to implement a specific type of discovery strategy depending on the types of devices, network, or ports being examined. Example agent types can include, but are not limited to, agents configured to actively browse active Common Industrial Protocol (CIP) applications (CIP Discovery), agents that support link layer discovery protocol (LLDP), agents configured to execute integrated ethernet network discovery strategies, agents that support OPC Unified Architecture (OPC-UA), agents configured to perform credentialed probing of Windows software applications, agents that support open architectures, agents that support TCP/IP, or other such agent types. Each discovery agent 304 can execute independently to collect and report topology information within its scope while being coordinated at a high level by the discovery component 204, which selectively deploys discovery agents 304 of various types based on information reported by other agents 304 in accordance with the discovery rules 308. Agents 304 can obtain relevant topology information from any of the physical, link, network, or application layers of an industrial enterprise.

Figure 5:
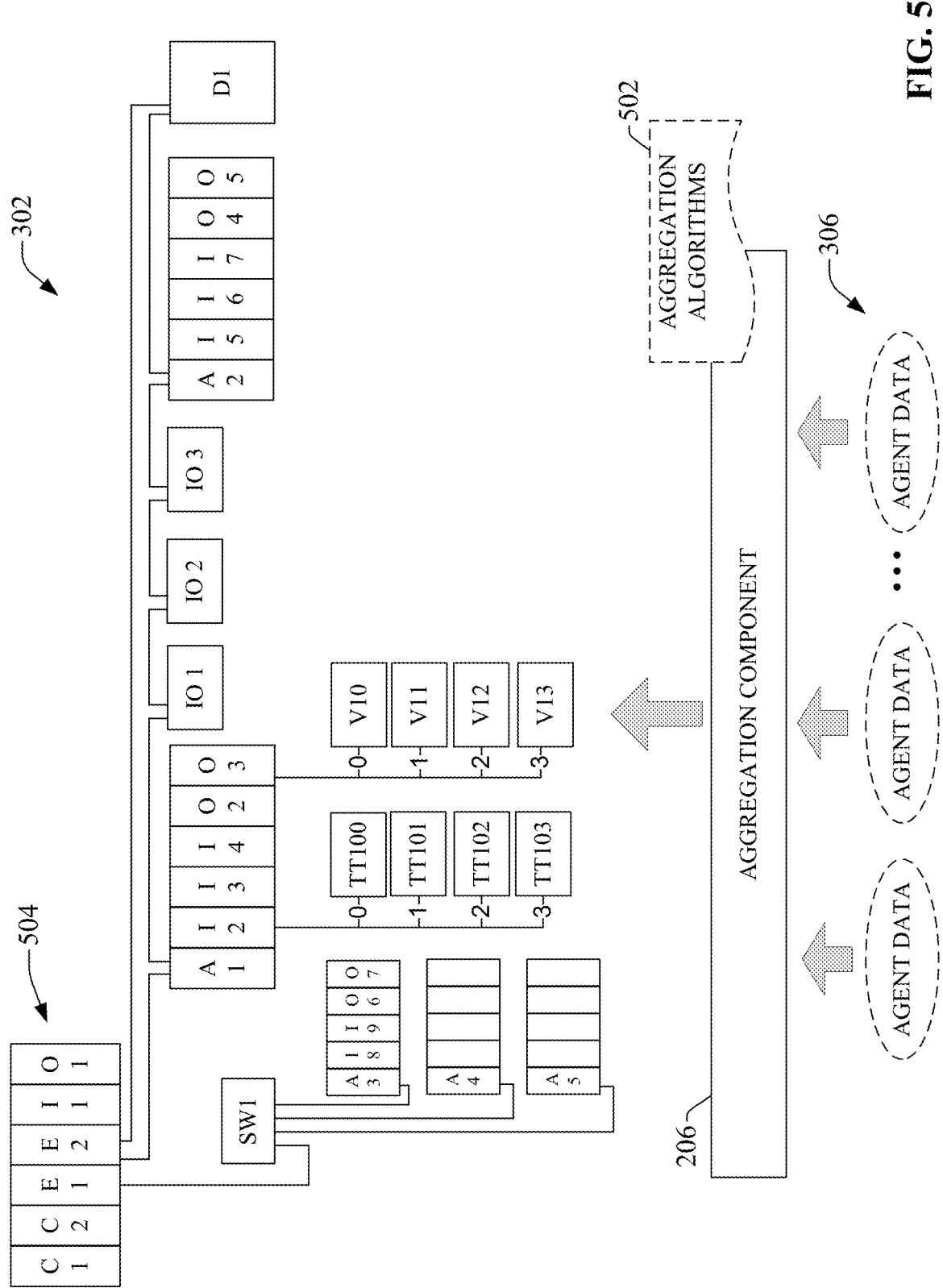
FIG. 5 is a diagram illustrating aggregation of agent data into a topology model.

The heterogeneous collection of agent data 306 submitted to the topology discovery system 202 by the discovery agents 306 is aggregated together by the aggregation component 206 to yield a topology model 302 for the automation system. FIG. 5 is a diagram illustrating aggregation of agent data 306 into a topology model 302 by the aggregation component 206. Topology model 302 documents the devices that make up the automation systems 310 as well as the available communication paths between those devices across the discovered networks. Topology model 302 can serve as a comprehensive system model for the automation system 310.

Aggregation component 206 can integrate the diverse items of agent data 306 reported by the discovery agents 304—e.g., the data 306 submitted by agents 304a-304d in FIG. 4—based on aggregation algorithms 502 that define how various types or values of agent data 306 are to be combined into a common topology model 302. For example, aggregation algorithms 502 can define how two disparate but related items of agent data 306 are to be integrated to yield a portion of the topology model 302. In some cases, aggregation component 206 can integrate sets of agent data 306 from different discovery agents 304 into a composite segment of the topology model 302 based on a determination that the diverse items of agent data 302 convey different topology characteristics of the same device, as determined based on a common device identifier included in the items of agent data 306 (e.g., a common MAC address, network address, device name, serial number, etc.).

In the example depicted in FIG. 4, discovery agent 304a can identify, based on passive monitoring of the network 116, two or more devices that are on the network 116 and that are exchanging data packets with one another. Aggregation component 206 can therefore use agent data 306 from this agent 304a to record communication paths between these devices over the network 116 as part of the topology model 302. Similarly, agent data 306 reported by discovery agent 304b can be used by the aggregation component 206 to further refine the topology model 302 to add additional information about one of the devices—controller 118—such as the device's device type, vendor, MAC address, firmware versions, available data ports, or other such information. The aggregation component 206 can further refine the model 302 based on agent data 306 submitted by discovery agent 304c, which reports the identities and types of devices that are connected to controller 118, including any I/O modules connected to the controller's backplane, the HMI terminal 114, I/O devices 404a-404c, and remote I/O module 408. The aggregation component 206 can also define, within the model 302, the communication paths between the controller and these various connected devices based on the agent data 306 from discovery agent 304c. Agent data 306 from discovery agent 304d is used by the aggregation component 206 to further update the model 302 by adding the identities of the remote I/O devices 406 connected to the remote I/O module, as well as the location of these I/O devices 406 within the hierarchical communication paths of the overall system typology. Aggregation component 206 can apply this general approach to integrate agent data 306 received from across the entire system topology into the topology model 302.

In general, the manner in which aggregation component 206 integrates sets of agent data 306 into the topology model 302, or otherwise updates the model 302 based on newly received agent data 306, will depend on the type of system information being submitted (e.g., device identities and configurations, communication links between devices, etc.), discovered commonalities between diverse items of agent data 306 (e.g., common device identifiers, common networks, etc.), and existing knowledge of the system topology already recorded in the topology model 302.

In some embodiments, each discovery agent 304 can be configured to digitally sign its agent data 306 before submission to the topology system 202. In such embodiments, the discovery component 204 can establish the authenticity of each set of agent data 306 based on its digital signature before allowing the data 306 to be processed by the aggregation component 206. This can ensure that the resulting topology model 302 accurately models the hardware components and their communication pathways present within the automation system 310.

The resulting topology model 302 generated and maintained by aggregation component 206 can model the automation system 310 in terms of the devices that make up the system 310 as well as the communication pathways between those devices. In an example format, each discovered device can be defined as a node within the model 302, and communication pathways can be defined as links between the device nodes. The example topology model 302 depicted in FIG. 5 includes a set of nodes 504 representing an industrial controller 504 with two control modules C1 and C2, two ethernet modules E1 and E2, an input module I1, and an output module O1. The ethernet port of the first ethernet module E1 is connected to a switch SW1, represented by node SW1 and linked to the ethernet module node E1. Switch SW1 is connected to remote I/O adapters A3-A5 which are each connected to a set of remote I/O modules. The second ethernet module E2 is networked to remote adapters A1 and A2—which each have their own set of I/O modules—as well as various other devices. Each of these devices is represented in the model 302 by a node having associated metadata that records additional information about the device (e.g., device name, device type, vendor or model information, network address, firmware version, manufacture date, operating mode, or other relevant information).

Figure 6:
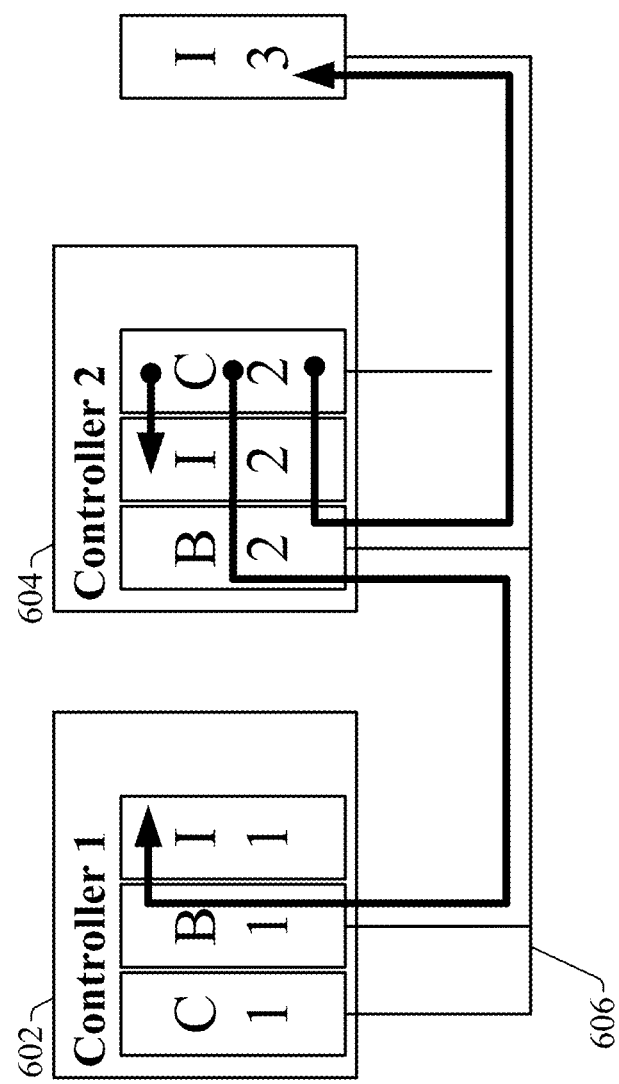
FIG. 6 is an example segment of a topology model illustrating example communication paths from an originator device to multiple target devices.

The aggregation component 206 can generate the topology model 302 to record available point-to-point communication paths between devices across one or more of the networks or communication busses that are part of the automation system 310 being modeled. FIG. 6 is an example representation of a segment of a topology model 302 illustrating example communication paths from an originator device to multiple target devices. In this example, the originator device is a controller module C2 of an industrial controller 604. The controller module C2 is configured to communicate with multiple other devices of the automation system 310. However, only three example communication paths are depicted in FIG. 6.

A first communication path is defined from the controller module C2 to an input module I2 in the same controller chassis as the controller module C2. Since controller module C2 and input module I2 reside in the same controller chassis, this communication path traverses only the backplane of the controller 604. A second communication path is defined from the controller C2 to an input module installed in a second controller 602. This communication path comprises multiple path segments over multiple communication networks and busses—a first segment from the controller module C2 to ethernet module B2 over the backplane of controller 604, a second segment from the ethernet module B2 to ethernet module B1 in the second controller over an ethernet network 606, and a third segment from the ethernet module B1 to the input module I1 over the backplane of controller 602. A third communication path is defined from the controller module C2 to a remote input module I3 that resides on an ethernet network 606. This communication path also comprises multiple path segments—a first segment from the controller module C2 to ethernet module B2 over the backplane of controller 604, and a second segment from the ethernet module B2 to the input module I3 over the ethernet network.

Such communication paths, including the multi-network or multi-bus segments that make up each path, can be discovered and reported by the discovery agents 304 or inferred by the aggregation component 206 based on analysis of the agent data 306 provided by the agents 304, as discussed above. The aggregation component 302 can record these communication paths in the topology model 302 so that available communication paths between pairs of devices of the automation system 310 are comprehensively documented. The topology model 302 can record each point-to-point communication path between two devices in terms of the identities of the two devices and the path segments that make up the point-to-point path. Each path segment that makes up a communication path can itself be defined in terms of the network protocol of the segment and any intermediate devices that delineate the endpoints of the segment. If multiple different communication paths to a device are available, the topology model 302 can document these redundant communication paths as part of the system topology.

Some embodiments of the topology discovery system 202 can allow an administrator to configure settings or preferences that determine how aspects of the agent-based discovery process are executed. These settings can allow an administrator to configure, for example, the frequency at which the discovery process is executed, which determines how quickly updates to the physical automation systems 310 are synchronized to the topology model 302. An administrator may also be permitted to edit the discovery rules 308 to specify a degree of granularity at which the automation systems 310 are to be documented. For example, an administrator may instruct the system 202 that only certain specified device types are to be recorded in the topology model 302 (or, alternatively, may specify types of devices that are not to be recorded). The administrator may also specify exclusive subsets of available device data that are of interest and that should be recorded in the topology model 302 (e.g., device identifiers and types), while other types of device data are not to be recorded (e.g., firmware versions, manufacturing date, etc.). This can afford the administrator a degree of control over the granularity of the model 302. The discovery component 204 and aggregation component 206 will be configured in accordance with the administrator's preference definitions, so that orchestration of the discovery agents 304 and aggregation of the agent data 306 accords to the administrator's preferences.

Figure 7:
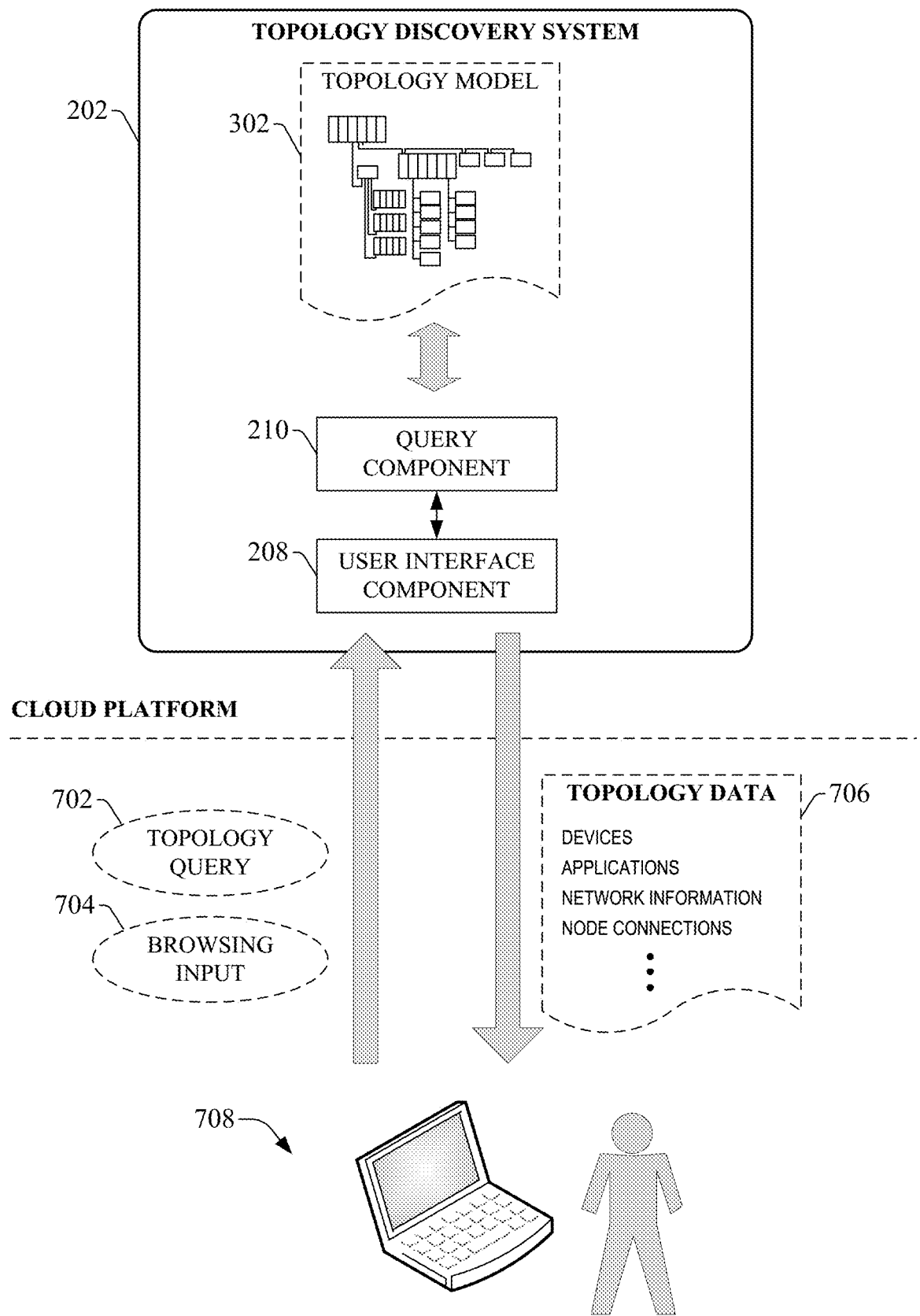
FIG. 7 is a diagram illustrating querying and browsing of the model.

The topology discovery system's user interface 208 can visualize the resulting topology model 302 on a client device and allow a user to browse or query the model 302 for information about the devices and networks that make up their automation systems. FIG. 7 is a diagram illustrating querying and browsing of the model 302. User interface component 208 can render a suitable graphical interface to a client device 708 of user having appropriate authorization to access the topology 302. In an example architecture, the system 202 can provide topology discovery services to multiple industrial enterprises or customer entities, and can store each customer's topology models 302 on the cloud platform in a secure and segregated manner such that each model 302 can be accessed and viewed only by authorized personnel associated with the owner of the model 302.

The user interface component 208 can render graphical user interfaces on the client device 708 that allow a user to view information stored in the model 302 by submitting queries 702 to the system 202 for specific subsets of topology information. Any suitable search criteria can be submitted as part of the topology query 702. For example, a user can submit a query 702 requesting a list of active devices of a specified device type, a list of active devices deployed at a specified production area of a plant facility, a list of devices whose firmware or warranties are out of date, or other such queries. The query component 210 can search the topology model 302 using content of the query 702 as search criteria and return the search results as topology data 706.

Some embodiments of the user interface component 208 can also be configured to render a browsable graphical representation of the topology model 302 on the client device 708. This graphical representation can render the devices of the topology 302 as device icons, and the communication paths can be represented as connecting lines between the devices. User interface component 208 can render different network types defined in the model 302 (e.g., ethernet, remote I/O, fieldbus, etc.) in a manner that visually distinguishes the different types of networks from one another; e.g., by rendering the connecting lines representing the networks in different colors according to network type.

The user can submit browsing input 704 to the system 202 by interacting with this visual representation of the model 302; e.g., by selecting nodes representing devices, or by selecting connecting lines representing the communication paths between the devices. Selecting a node or connecting line of the graphical representation can cause the query component 210 to retrieve information about the selected device or network segment, which is rendered on the client device 708 by the user interface 208. In the case of devices, this information can include the device's type and identity, vendor and model information, network address, currently installed firmware version, applications installed on the device, configuration information, or other such information. Selecting a network can invoke such information as the network type, network settings, statistics on the network's used or available bandwidth (which can be calculated by the system 202 based on the devices currently connected to the network and their communication configuration), a list of devices communicating over the network, potential security vulnerabilities, or other such network information.

Figure 8:
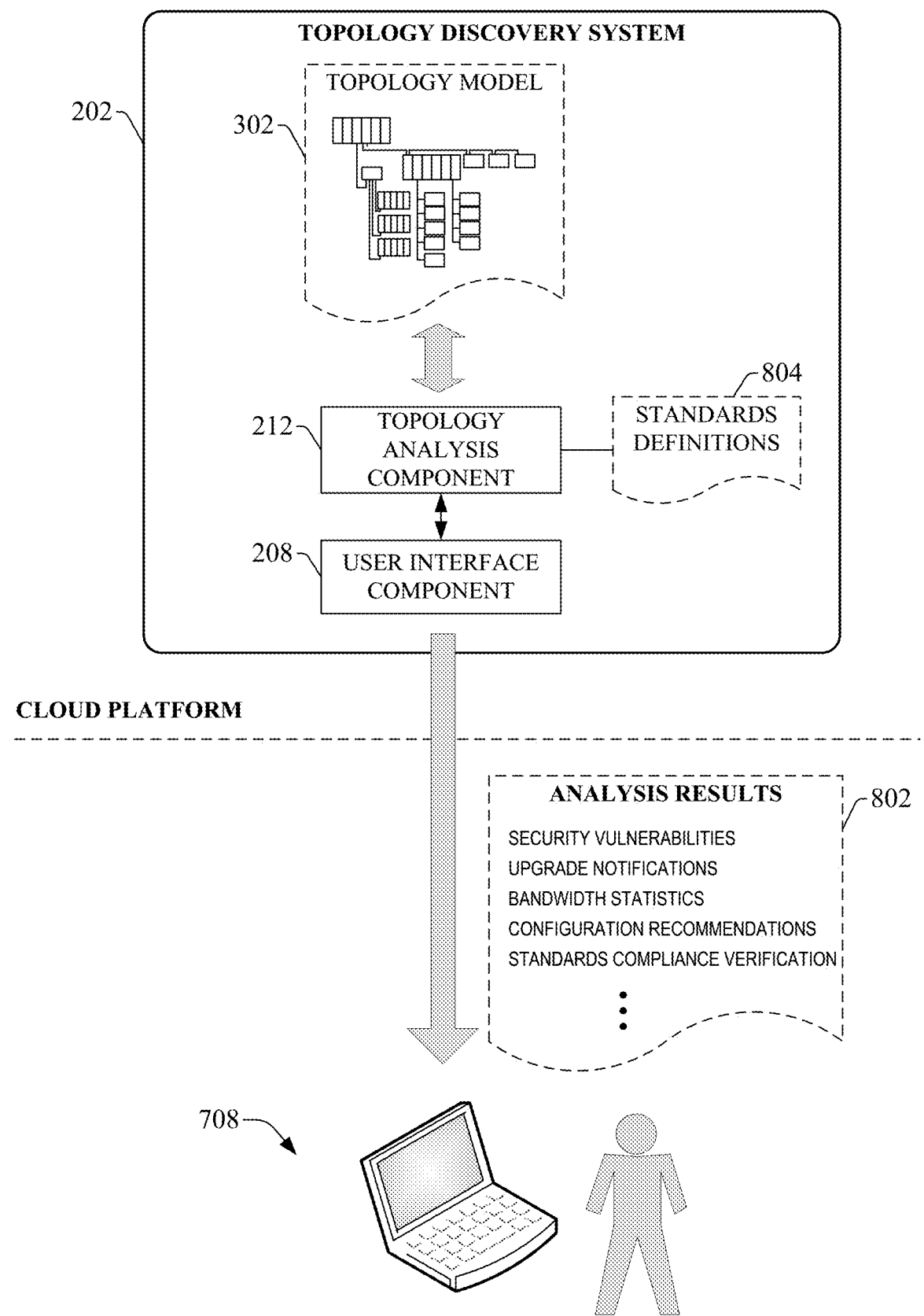
FIG. 8 is a diagram illustrating analysis of a topology model by the topology discovery system.

Some embodiments of the topology discovery system 202 can also include a topology analysis component 212 configured to analyze the topology model 302 and generate statistics and recommendations based on the analysis. FIG. 8 is a diagram illustrating analysis of the topology model 302 by the system 202. In various embodiments, the topology analysis component 212 can analyze the topology model 302 over a range of metrics and render results of the analysis on a client device 708. For example, topology analysis component 212 can be configured to analyze the device and network configurations documented in the topology model 302 and identify potential security vulnerabilities (e.g., a network ingress path through which an outside attacker can potentially remotely access the control devices of the automation system 310). Analysis component 212 can also identify devices of the automation system 310 requiring firmware upgrades in order to mitigate potential security vulnerabilities. Other types of risk analysis can also be applied to the model 302 by the analysis component 212.

Also, some embodiments of topology discovery system 202 can allow an administrator to define enterprise-specific standards or policies to be enforced for automation systems or network designs within the enterprise's industrial facilities. These polices can be stored as standards definitions 804 and applied to the model 302 by the topology analysis component 212 to ensure compliance with the enterprise standards. An example standards definition 804 could dictate that all data traffic to a specified group of devices is to go through a designated secure data tunnel. Accordingly, the topology analysis component 212 can analyze the topology model 302 to verify that there are no communication paths to the specified group of devices that bypass the secure tunnel. Other such restrictions on data traffic, applicable to a specified subset of devices, can also be defined as security definitions 804 and applied to the model 302. Information about non-compliant data paths or other deviations from defined standards can be rendered on client device 708 by the user interface component 208.

Other types of standards definitions 804 can include, for example, authorized device vendors whose equipment is to be used exclusively in the enterprise's automation systems, limits on the data traffic or device loads on network segments, or other such standards. Based on analysis of the topology model 302 in view of standards definitions 804, topology analysis component 212 can generate notifications of any deviations discovered between the actual system topology—as recorded in the model 302—and the defined standards definitions 804. In some embodiments, the user interface component 208 can render these notifications on client device 708 both as text-based descriptions of the deviations as well as graphical indications of the relevant portion of the topology found to be non-compliant. Topology analysis component 212 can also generate recommendations for reconfiguring the system topology—e.g., by reconfiguring or replacing a specified device, by rerouting a network path, by adding a new network infrastructure device at a specified location, etc.—in a manner that brings the automation system design into compliance with the standards definitions 804.

The topology model 302 generated by the topology discovery system 202 can be used in a variety of applications that could beneficially leverage the system documentation recorded in the model 302. For example, an industrial design platform, such as an integrated development environment (IDE) system, can import and use the topology model 302 to generate portions of an industrial design control project—e.g., device configurations, controller programming, etc.—based on the hardware design of the physical automation system recorded in the model 302.

Figure 9:
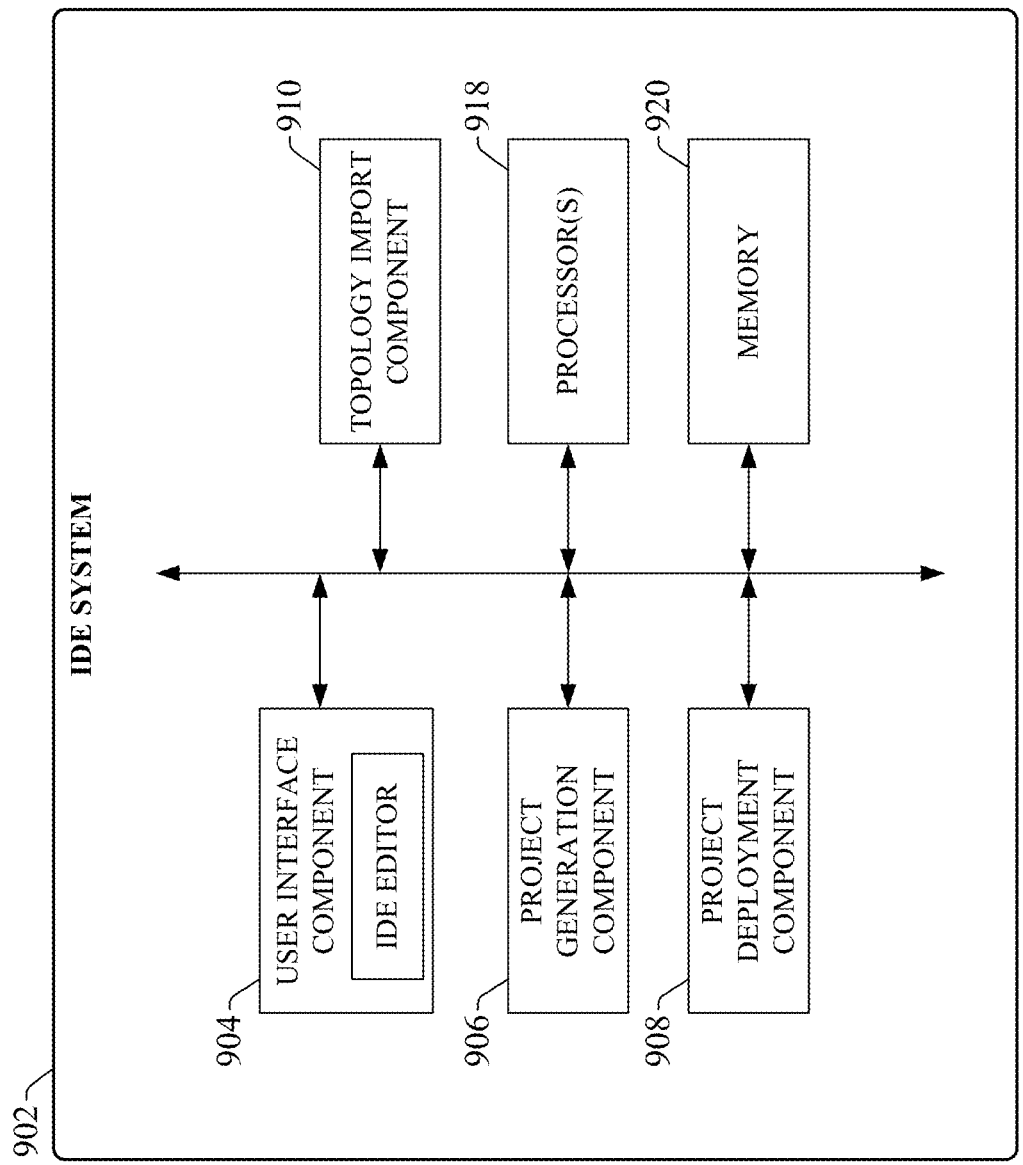
FIG. 9 is a block diagram of an example industrial IDE system that can import and leverage a topology model in connection with generating portions of an industrial control project.

FIG. 9 is a block diagram of an example industrial IDE system 902 that can import and leverage topology model 302 in connection with generating portions of an industrial control project according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 902 can include a user interface component 904 including an IDE editor, a project generation component 906, a project deployment component 908, a topology import component 910, one or more processors 918, and memory 920. In various embodiments, one or more of the user interface component 904, project generation component 906, project deployment component 908, topology import component 910, the one or more processors 918, and memory 920 can be electrically and/or communicatively coupled to one another to perform one or more of the functions of the IDE system 902. In some embodiments, components 904, 906, 908, and 910 can comprise software instructions stored on memory 920 and executed by processor(s) 918. IDE system 902 may also interact with other hardware and/or software components not depicted in FIG. 9. For example, processor(s) 918 may interact with one or more external user interface devices, such as a keyboard, a mouse, a display monitor, a touchscreen, or other such interface devices.

User interface component 904 can be configured to receive user input and to render output to the user in any suitable format (e.g., visual, audio, tactile, etc.). In some embodiments, user interface component 904 can be configured to communicatively interface with an IDE client that executes on a client device (e.g., a laptop computer, tablet computer, smart phone, etc.) that is communicatively connected to the IDE system 902 (e.g., via a hardwired or wireless connection). The user interface component 904 can then receive user input data and render output data via the IDE client. In other embodiments, user interface component 904 can be configured to generate and serve suitable interface screens to a client device (e.g., program development screens), and exchange data via these interface screens. Input data that can be received via various embodiments of user interface component 904 can include, but is not limited to, programming code, industrial design specifications or goals, engineering drawings, AR/VR input, DSL definitions, video or image data, device configuration data, device profile definition data, or other such input. Output data rendered by various embodiments of user interface component 904 can include program code, programming feedback (e.g., error and highlighting, coding suggestions, etc.), programming and visualization development screens, project testing results, etc.

Project generation component 906 can be configured to create a system project comprising one or more project files based on design input received via the user interface component 904, as well as industrial knowledge, predefined code modules and visualizations, and automation objects maintained by the IDE system 902. Project deployment component 908 can be configured to commission the system project created by the project generation component 906 to appropriate industrial devices (e.g., controllers, HMI terminals, motor drives, AR/VR systems, etc.) for execution. To this end, project deployment component 908 can identify the appropriate target devices to which respective portions of the system project should be sent for execution, translate these respective portions to formats understandable by the target devices, and deploy the translated project components to their corresponding devices.

Topology import component 910 can be configured to import a topology model 302 generated by the topology discovery system 202 and to translate information about an automation system recorded in the model 302 to portions of a system project. This can include, for example, creating a project tree based on the industrial devices and their relationships as defined in the model 302, adding device profiles corresponding to devices identified in the model to a system project, generating portions of industrial controller code (e.g., ladder logic or other types of control code) based information about the automation system obtained from the model 302, or generating other portions of the system project.

The one or more processors 918 can perform one or more of the functions described herein with reference to the systems and/or methods disclosed. Memory 920 can be a computer-readable storage medium storing computer-executable instructions and/or information for performing the functions described herein with reference to the systems and/or methods disclosed.

Figure 10:
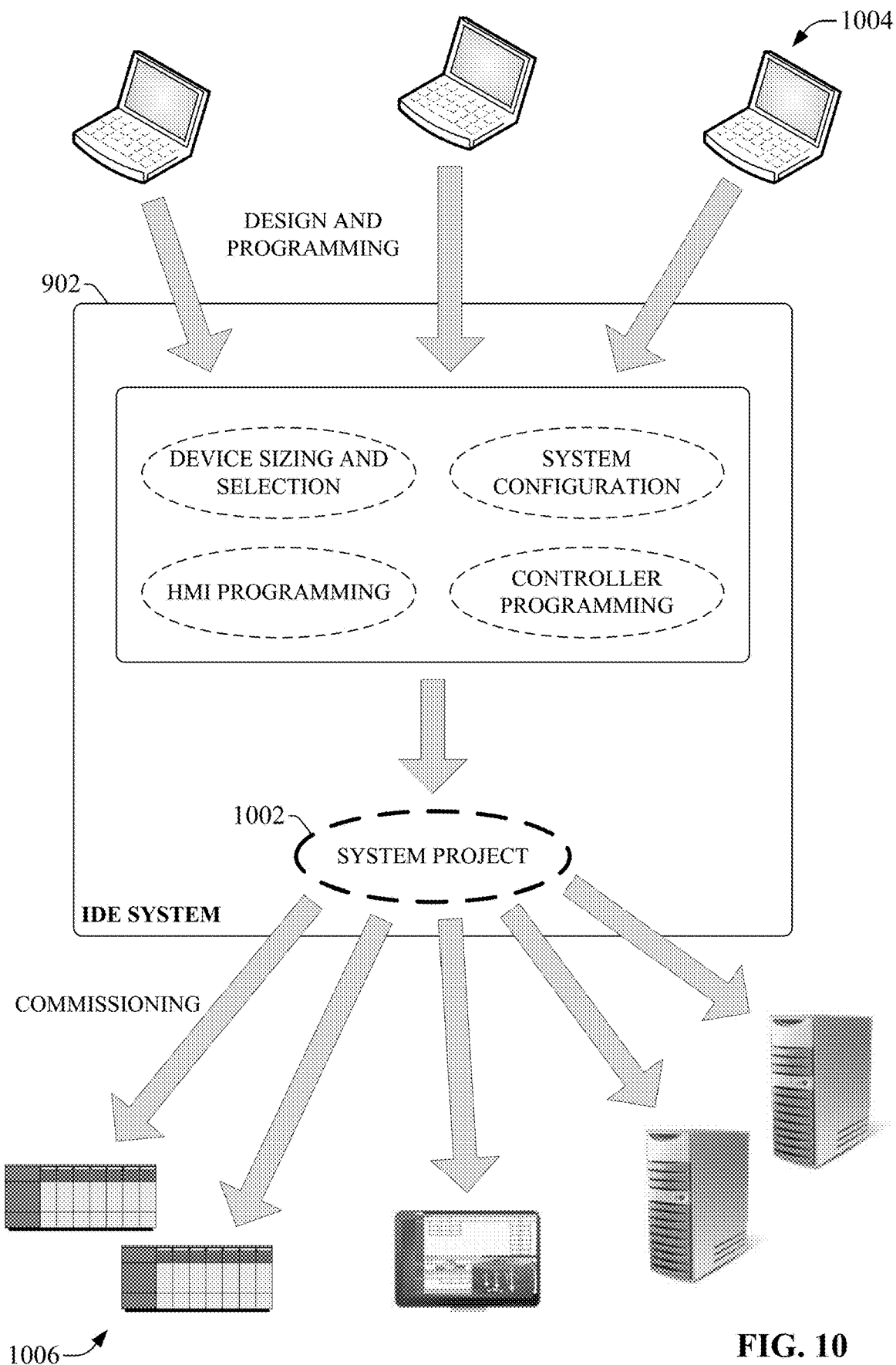
FIG. 10 is a diagram illustrating a generalized architecture of the industrial IDE system.

FIG. 10 is a diagram illustrating a generalized architecture of the industrial IDE system 902 according to one or more embodiments. Industrial IDE system 902 can implement a common set of services and workflows spanning not only design, but also commissioning, operation, and maintenance. In terms of design, the IDE system 902 can support not only industrial controller programming and HMI development, but also sizing and selection of system components, device/system configuration, AR/VR visualizations, and other features. The IDE system 902 can also include tools that simplify and automate commissioning of the resulting project and assist with subsequent administration of the deployed system during runtime.

Embodiments of the IDE system 902 that are implemented on a cloud platform also facilitate collaborative project development whereby multiple developers 1004 contribute design and programming input to a common automation system project 1002. Collaborative tools supported by the IDE system can manage design contributions from the multiple contributors and perform version control of the aggregate system project 1002 to ensure project consistency.

Based on design and programming input from one or more developers 1004, IDE system 902 generates a system project 1002 comprising one or more project files. The system project 1002 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 902 can identify the appropriate target devices 1006 on which respective aspects of the system project 1002 should be executed (e.g., industrial controllers, HMI terminals, variable frequency drives, safety devices, etc.), translate the system project 1002 to executable files that can be executed on the respective target devices, and deploy the executable files to their corresponding target devices 1006 for execution, thereby commissioning the system project 1002 to the plant floor for implementation of the automation project.

Figure 11:
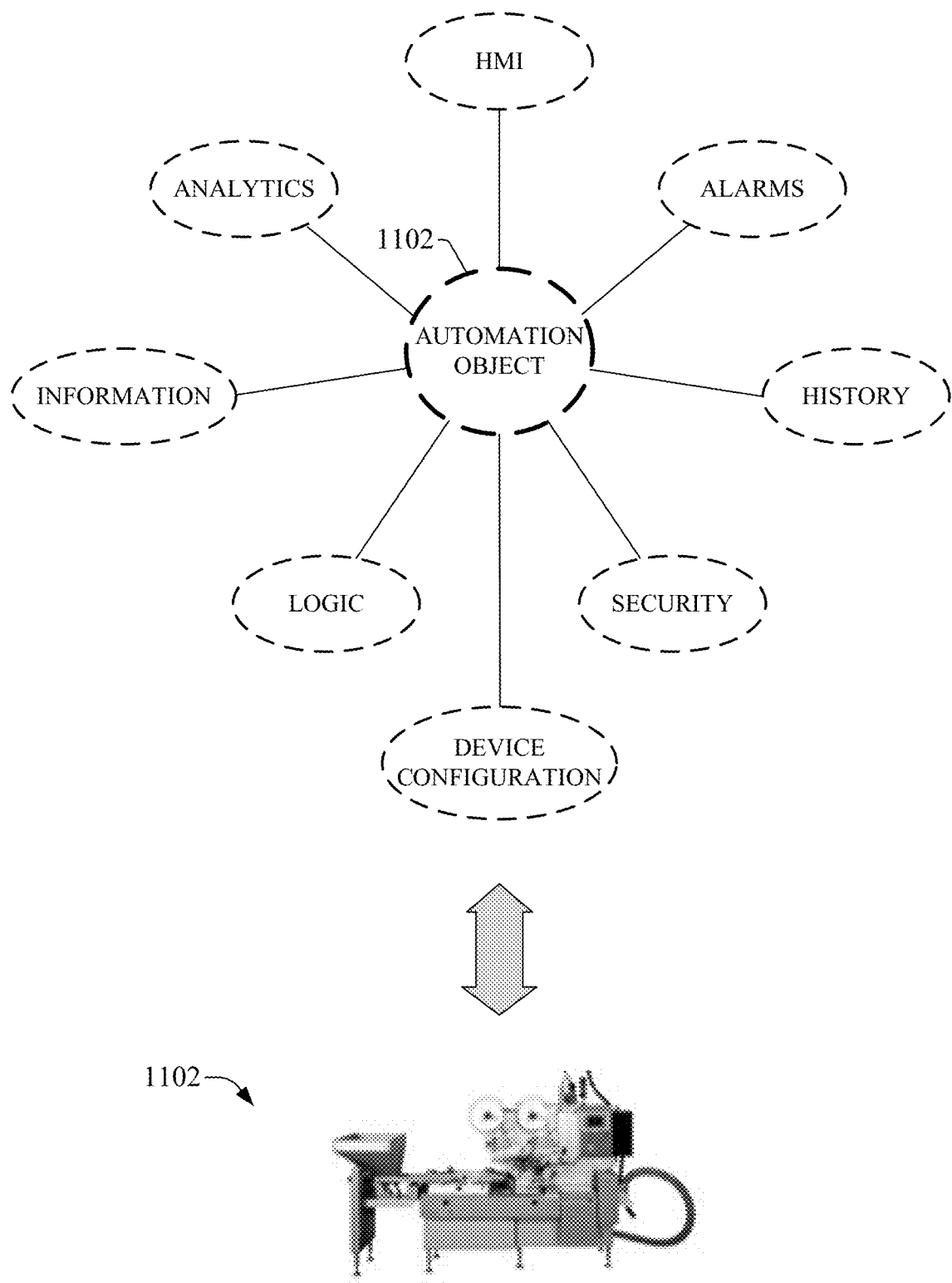
FIG. 11 is a diagram illustrating several example automation object properties that can be leveraged by the IDE system in connection with building, deploying, and executing a system project.

To support enhanced development capabilities, some embodiments of IDE system 902 can be built on an object-based data model rather than, or in addition to, a tag-based architecture. Automation objects 1102 serve as the building block for this object-based development architecture. FIG. 11 is a diagram illustrating several example automation object properties that can be leveraged by the IDE system 902 in connection with building, deploying, and executing a system project 1002. Automation objects 1102 can be created and augmented during design, integrated into larger data models, and consumed during runtime. These automation objects 1102 provide a common data structure across the IDE system 902 and can be stored in an object library (e.g., part of memory 920) for reuse. The object library can store predefined automation objects 1102 representing various classifications of real-world industrial assets 1102, including but not limited to pumps, tanks, valves, motors, motor drives (e.g., variable frequency drives), industrial robots, actuators (e.g., pneumatic or hydraulic actuators), or other such assets. Automation objects 1102 can represent elements at substantially any level of an industrial enterprise, including individual devices, machines made up of many industrial devices and components (some of which may be associated with their own automation objects 1102), and entire production lines or process control systems.

An automation object 1102 for a given type of industrial asset can encode such aspects as 2D or 3D visualizations, alarms, control coding (e.g., logic or other type of control programming), analytics, startup procedures, testing protocols and scripts, validation reports, simulations, schematics, security protocols, and other such properties associated with the industrial asset 902 represented by the object 1102. As will be described in more detail herein, an automation object 1102 can also store device configuration settings for an industrial device as a sequence of mouse and keystroke interactions with a device profile configuration interface, such that these interactions can be played back to facilitate reproducing the device configuration for another device.

Automation objects 1102 can also be geotagged with location information identifying the location of the associated asset. During runtime of the system project 1002, the automation object 1102 corresponding to a given real-world asset 1102 can also record status or operational history data for the asset. In general, automation objects 1102 serve as programmatic representations of their corresponding industrial assets 1102, and can be incorporated into a system project 1002 as elements of control code, a 2D or 3D visualization, a knowledgebase or maintenance guidance system for the industrial assets, or other such aspects.

Figure 12:
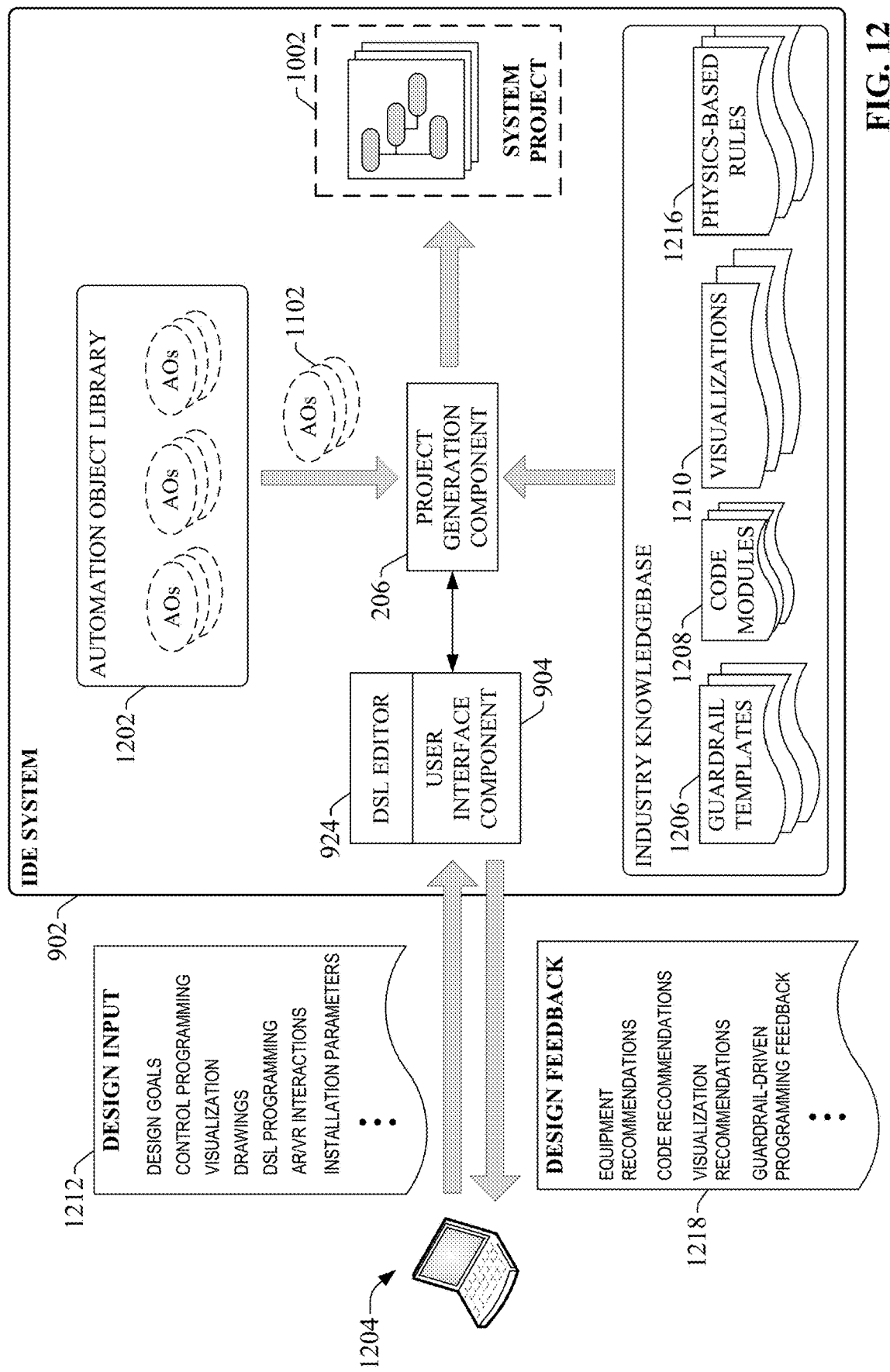
FIG. 12 is a diagram illustrating example data flows associated with creation of a system project for an automation system being designed using IDE system.

FIG. 12 is a diagram illustrating example data flows associated with creation of a system project 1002 for an automation system being designed using IDE system 902 according to one or more embodiments. A client device 1204 (e.g., a laptop computer, tablet computer, desktop computer, mobile device, wearable AR/VR appliance, etc.) having suitable access privileges can access the IDE system's project development tools and leverage these tools to create a comprehensive system project 1002 for an automation system being developed. Through interaction with the system's user interface component 904, developers can submit design input 1212 to the IDE system 902 in various supported formats, including industry-specific control programming (e.g., control logic, structured text, sequential function charts, etc.) and HMI screen configuration input. Based on this design input 1212 and information stored in an industry knowledgebase (predefined code modules 1208 and visualizations 1210, guardrail templates 1206, physics-based rules 1216, etc.), user interface component 904 renders design feedback 1218 designed to assist the developer in connection with developing a system project 1002 for configuration, control, and visualization of an industrial automation system.

In addition to control programming and visualization definitions, some embodiments of IDE system 902 can be configured to receive digital engineering drawings (e.g., computer-aided design (CAD) files) as design input 1212. In such embodiments, project generation component 906 can generate portions of the system project 1002—e.g., by automatically generating control and/or visualization code—based on analysis of existing design drawings. Drawings that can be submitted as design input 1212 can include, but are not limited to, P&ID drawings, mechanical drawings, flow diagrams, or other such documents. For example, a P&ID drawing can be imported into the IDE system 902, and project generation component 906 can identify elements (e.g., tanks, pumps, etc.) and relationships therebetween conveyed by the drawings. Project generation component 906 can associate or map elements identified in the drawings with appropriate automation objects 1102 corresponding to these elements (e.g., tanks, pumps, etc.) and add these automation objects 1102 to the system project 1002. The device-specific and asset-specific automation objects 1102 include suitable code and visualizations to be associated with the elements identified in the drawings. In general, the IDE system 902 can examine one or more different types of drawings (mechanical, electrical, piping, etc.) to determine relationships between devices, machines, and/or assets (including identifying common elements across different drawings) and intelligently associate these elements with appropriate automation objects 1102, code modules 1208, and/or visualizations 1210. The IDE system 902 can leverage physics-based rules 1216 as well as pre-defined code modules 1208 and visualizations 1210 as necessary in connection with generating code or project data for system project 1002.

Also, or in addition, some embodiments of IDE system 902 can support goal-based automated programming. For example, the user interface component 904 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 906 will generate portions of the system project 1002 to satisfy the specified design goals and constraints. Portions of the system project 1002 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 906 can also generate at least some of the project code for system project 1002 based on knowledge of parts that have been ordered for the project being developed. This can involve accessing the customer's account information maintained by an equipment vendor to identify devices that have been purchased for the project. Based on this information the project generation component 906 can add appropriate automation objects 1102 and associated code modules 1208 corresponding to the purchased assets, thereby providing a starting point for project development.

In some embodiments, IDE system 902 can also store and implement guardrail templates 1206 that define design guardrails intended to ensure the project's compliance with internal or external design standards. Based on design parameters defined by one or more selected guardrail templates 1206, user interface component 904 can provide, as a subset of design feedback 1218, dynamic recommendations or other types of feedback designed to guide the developer in a manner that ensures compliance of the system project 1002 with internal or external requirements or standards (e.g., certifications such as TUV certification, in-house design standards, industry-specific or vertical-specific design standards, etc.). This feedback 1218 can take the form of text-based recommendations (e.g., recommendations to rewrite an indicated portion of control code to comply with a defined programming standard), syntax highlighting, error highlighting, auto-completion of code snippets, or other such formats. In this way, IDE system 902 can customize design feedback 1218—including programming recommendations, recommendations of predefined code modules 1208 or visualizations 1210, error and syntax highlighting, etc.—in accordance with the type of industrial system being developed and any applicable in-house design standards.

Guardrail templates 1206 can also be designed to maintain compliance with global best practices applicable to control programming or other aspects of project development. For example, user interface component 904 may generate and render an alert if a developer's control programing is deemed to be too complex as defined by criteria specified by one or more guardrail templates 1206. Since different verticals (e.g., automotive, pharmaceutical, oil and gas, food and drug, marine, etc.) must adhere to different standards and certifications, the IDE system 902 can maintain a library of guardrail templates 1206 for different internal and external standards and certifications, including customized user-specific guardrail templates 1206. These guardrail templates 1206 can be classified according to industrial vertical, type of industrial application, plant facility (in the case of custom in-house guardrail templates 1206) or other such categories. During development, project generation component 906 can select and apply a subset of guardrail templates 1206 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 906 can leverage guardrail templates 1206 to implement rules-based programming, whereby programming feedback (a subset of design feedback 1218) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 1206 against code provided by outside vendors (e.g., OEMs) to ensure that this code complies with in-house programming standards. In such scenarios, vendor-provided code can be submitted to the IDE system 902, and project generation component 906 can analyze this code in view of in-house coding standards specified by one or more custom guardrail templates 1206. Based on results of this analysis, user interface component 904 can indicate portions of the vendor-provided code (e.g., using highlights, overlaid text, etc.) that do not conform to the programming standards set forth by the guardrail templates 1206, and display suggestions for modifying the code in order to bring the code into compliance. As an alternative or in addition to recommending these modifications, some embodiments of project generation component 906 can be configured to automatically modify the code in accordance with the recommendations to bring the code into conformance.

In making coding suggestions as part of design feedback 1218, project generation component 906 can invoke selected code modules 1208 stored in a code module database or selected automation objects 1102 stored in an automation object library 1202 (e.g., on memory 220). Code modules 1208 comprise standardized coding segments for controlling common industrial tasks or applications (e.g., palletizing, flow control, web tension control, pick-and-place applications, conveyor control, etc.). Similarly, automation objects 1102 representing respective industrial assets may have associated therewith standardize control code for monitoring and controlling their respective assets. In some embodiments, code modules 1208 and/or automation objects 1102 can be categorized according to one or more of an industrial vertical (e.g., automotive, food and drug, oil and gas, textiles, marine, pharmaceutical, etc.), an industrial application, or a type of machine or device to which the code module 1208 or automation object 1102 is applicable.

In some embodiments, project generation component 906 can infer a programmer's current programming task or design goal based on programmatic input being provided by the programmer (as a subset of design input 1212), and determine, based on this task or goal, whether one of the pre-defined code modules 1208 or automation objects 1102 may be appropriately added to the control program being developed to achieve the inferred task or goal. For example, project generation component 906 may infer, based on analysis of design input 1212, that the programmer is currently developing control code for transferring material from a first tank to another tank, and in response, recommend inclusion of a predefined code module 1208 comprising standardized or frequently utilized code for controlling the valves, pumps, or other assets necessary to achieve the material transfer. Similarly, the project generation component 906 may recommend inclusion of an automation object 1102 representing one of the tanks, or one of the other industrial assets involved in transferring the material (e.g., a valve, a pump, etc.), where the recommended automation object 1102 includes associated control code for controlling its associated asset as well as a visualization object that can be used to visualize the asset on an HMI application or another visualization application.

Customized guardrail templates 1206 can also be defined to capture nuances of a customer site that should be taken into consideration in the project design. For example, a guardrail template 1206 could record the fact that the automation system being designed will be installed in a region where power outages are common, and will factor this consideration when generating design feedback 1218; e.g., by recommending implementation of backup uninterruptable power supplies and suggesting how these should be incorporated, as well as recommending associated programming or control strategies that take these outages into account.

IDE system 902 can also use guardrail templates 1206 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 1212, and user interface component 904 can render the equipment recommendations as a subset of design feedback 1218. In conjunction with this equipment recommendation, the project generation component 906 can also recommend inclusion of corresponding automation objects 1102 representing the recommended equipment for inclusion in the system project 1002.

Figure 13:
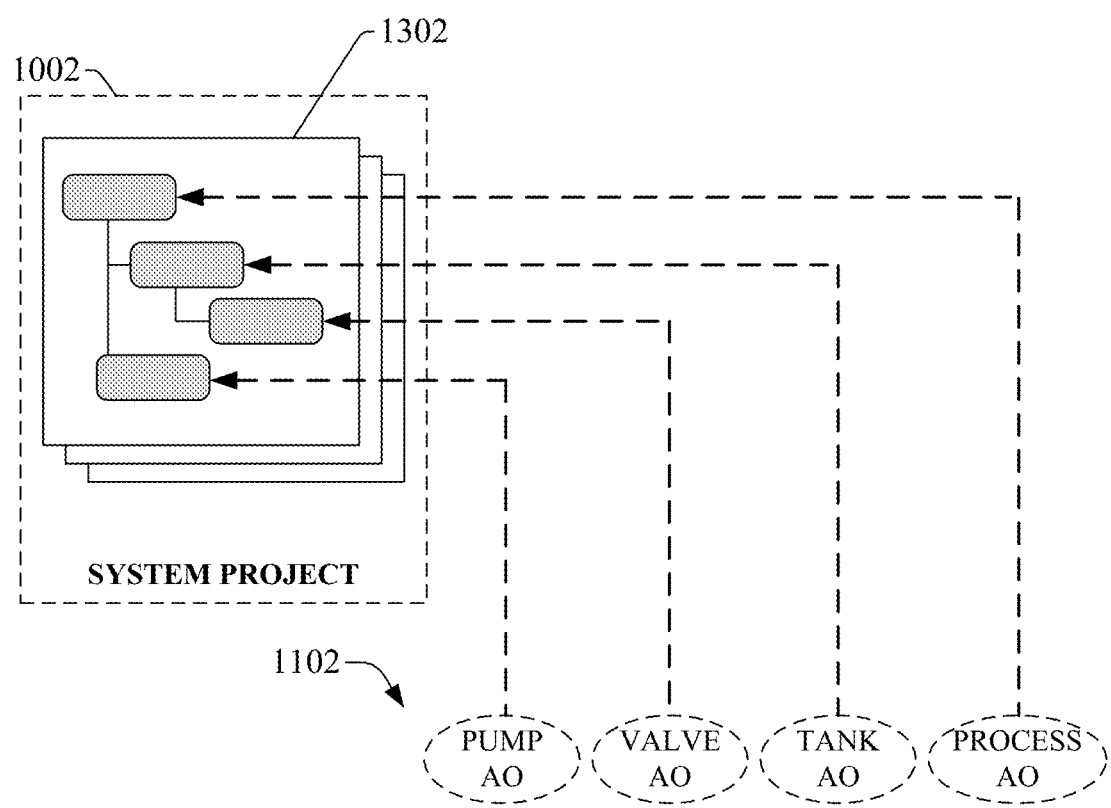
FIG. 13 is a diagram illustrating an example system project that incorporates automation objects into a project model.

As noted above, the system project 1002 generated by IDE system 902 for a given automaton system being designed can be built upon an object-based architecture that uses automation objects 1102 as building blocks. FIG. 13 is a diagram illustrating an example system project 1002 that incorporates automation objects 1102 into the project model. In this example, various automation objects 1102 representing analogous industrial devices, systems, or assets of an automation system (e.g., a process, tanks, valves, pumps, etc.) have been incorporated into system project 1002 as elements of a larger project data model 1302. The project data model 1302 also defines hierarchical relationships between these automation objects 1102. According to an example relationship, a process automation object representing a batch process may be defined as a parent object to a number of child objects representing devices and equipment that carry out the process, such as tanks, pumps, and valves. Each automation object 1102 has associated therewith object properties or attributes specific to its corresponding industrial asset (e.g., those discussed above in connection with FIG. 11), including executable control programming for controlling the asset (or for coordinating the actions of the asset with other industrial assets) and visualizations that can be used to render relevant information about the asset during runtime.

At least some of the attributes of each automation object 1102 are default properties defined by the IDE system 902 based on encoded industry expertise pertaining to the asset represented by the objects. These default properties can include, for example, industry-standard or recommended control code for monitoring and controlling the asset represented by the automation object 1102, a 2D or 3D graphical object that can be used to visualize operational or statistical data for the asset, alarm conditions associated with the asset, analytic or reporting scripts designed to yield actionable insights into the asset's behavior, or other such properties. Other properties can be modified or added by the developer as needed (via design input 1212) to customize the automation object 1102 for the particular asset and/or industrial application for which the system projects 1002 is being developed. This can include, for example, associating customized control code, HMI screens, AR presentations, or help files associated with selected automation objects 1102. In this way, automation objects 1102 can be created and augmented as needed during design for consumption or execution by target control devices during runtime.

Figure 14:
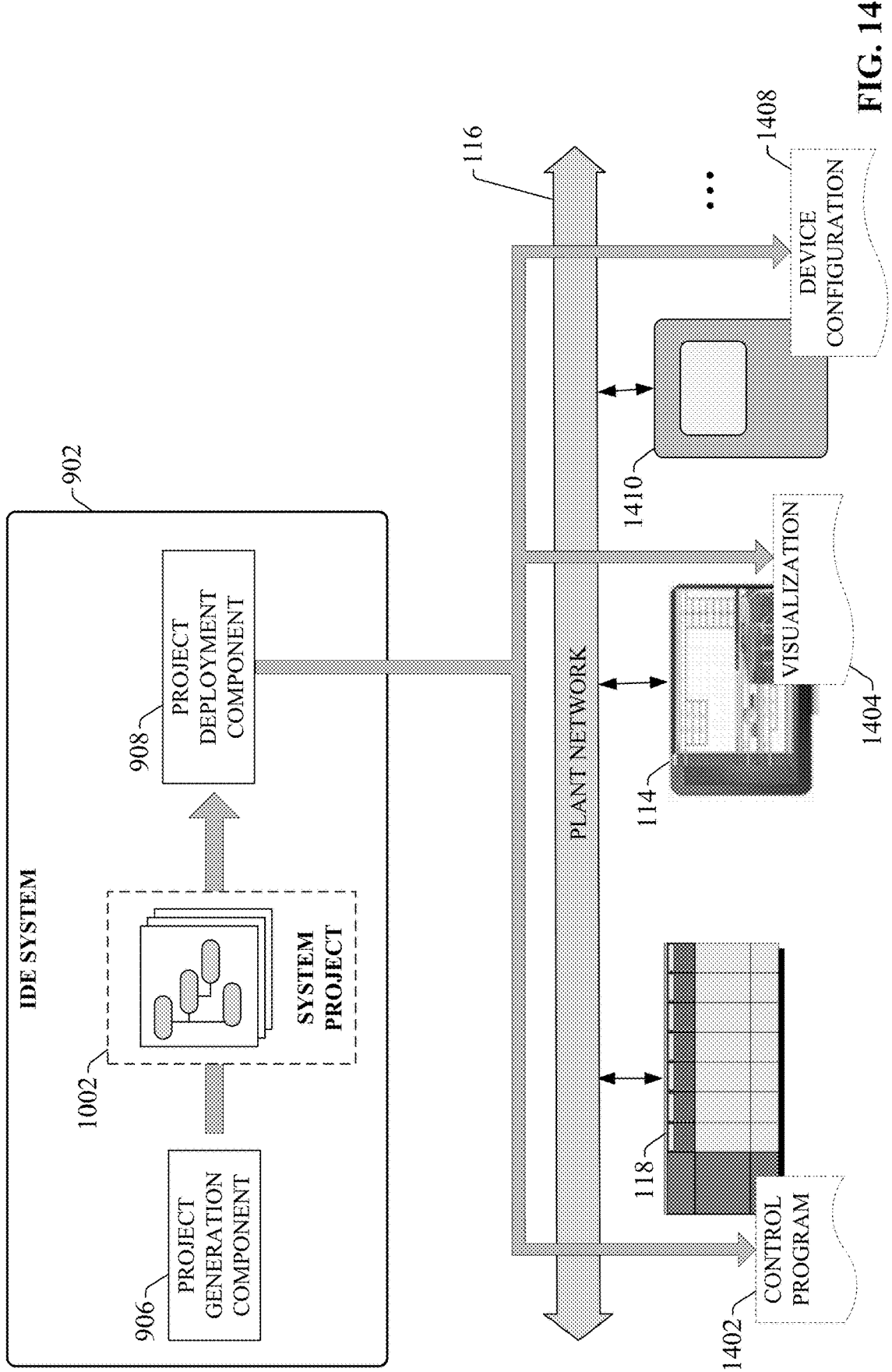
FIG. 14 is a diagram illustrating commissioning of a system project.

Once development and testing on a system project 1002 has been completed, commissioning tools supported by the IDE system 902 can simplify the process of commissioning the project in the field. When the system project 1002 for a given automation system has been completed, the system project 1002 can be deployed to one or more target control devices for execution. FIG. 14 is a diagram illustrating commissioning of a system project 1002. Project deployment component 908 can compile or otherwise translate a completed system project 1002 into one or more executable files or configuration files that can be stored and executed on respective target industrial devices of the automation system (e.g., industrial controllers 118, HMI terminals 114 or other types of visualization systems, motor drives 1410, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 902 can abstract project development from the specific controller type, allowing the designer to develop the system project 1002 as a logical representation of the automation system in a manner that is agnostic to where and how the various control aspects of system project 1002 will run. Once project development is complete and system project 1002 is ready for commissioning, the user can specify (via user interface component 904) target devices on which respective aspects of the system project 1002 are to be executed. In response, an allocation engine of the project deployment component 908 will translate aspects of the system project 1002 to respective executable files formatted for storage and execution on their respective target devices.

For example, system project 1002 may include—among other project aspects—control code, visualization screen definitions, and motor drive parameter definitions. Upon completion of project development, a user can identify which target devices—including an industrial controller 118, an HMI terminal 114, and a motor drive 1410—are to execute or receive these respective aspects of the system project 1002. Project deployment component 908 can then translate the controller code defined by the system project 1002 to a control program file 1402 formatted for execution on the specified industrial controller 118 and send this control program file 1402 to the controller 118 (e.g., via plant network 116). Similarly, project deployment component 908 can translate the visualization definitions and motor drive parameter definitions to a visualization application 1404 and a device configuration file 1408, respectively, and deploy these files to their respective target devices for execution and/or device configuration.

In general, project deployment component 908 performs any conversions necessary to allow aspects of system project 1002 to execute on the specified devices. Any inherent relationships, handshakes, or data sharing defined in the system project 1002 are maintained regardless of how the various elements of the system project 1002 are distributed. In this way, embodiments of the IDE system 902 can decouple the project from how and where the project is to be run. This also allows the same system project 1002 to be commissioned at different plant facilities having different sets of control equipment. That is, some embodiments of the IDE system 902 can allocate project code to different target devices as a function of the particular devices found on-site. IDE system 902 can also allow some portions of the project file to be commissioned as an emulator or on a cloud-based controller.

As an alternative to having the user specify the target control devices to which the system project 1002 is to be deployed, some embodiments of IDE system 902 can actively connect to the plant network 116 and discover available devices, ascertain the control hardware architecture present on the plant floor, infer appropriate target devices for respective executable aspects of system project 1002, and deploy the system project 1002 to these selected target devices. As part of this commissioning process, IDE system 902 can also connect to remote knowledgebases (e.g., web-based or cloud-based knowledgebases) to determine which discovered devices are out of date or require firmware upgrade to properly execute the system project 1002. In this way, the IDE system 902 can serve as a link between device vendors and a customer's plant ecosystem via a trusted connection in the cloud.

Copies of system project 1002 can be propagated to multiple plant facilities having varying equipment configurations using smart propagation, whereby the project deployment component 908 intelligently associates project components with the correct industrial asset or control device even if the equipment on-site does not perfectly match the defined target (e.g., if different pump types are found at different sites). For target devices that do not perfectly match the expected asset, project deployment component 908 can calculate the estimated impact of running the system project 1002 on non-optimal target equipment and generate warnings or recommendations for mitigating expected deviations from optimal project execution.

Figure 15:
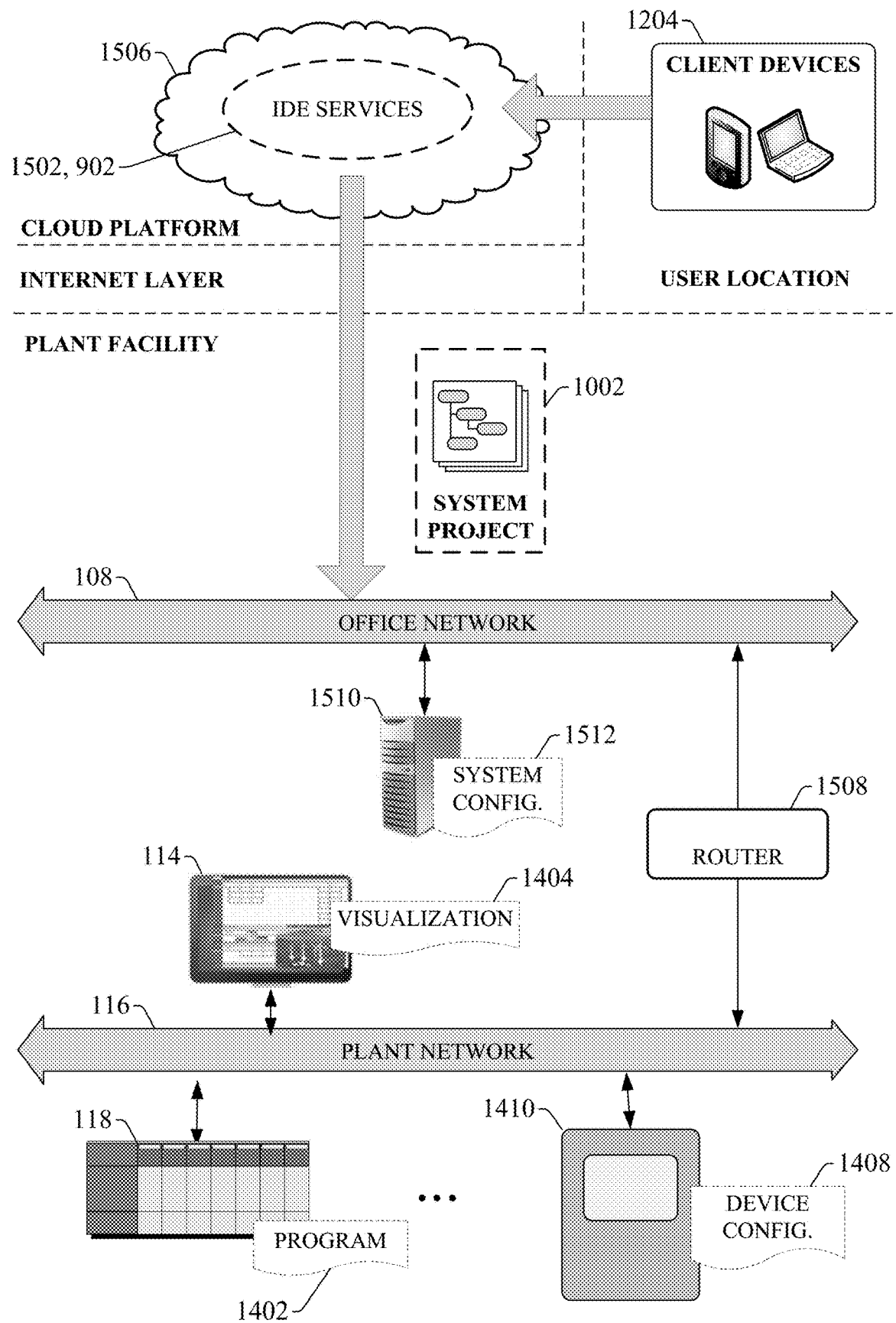
FIG. 15 is a diagram illustrating an example architecture in which cloud-based IDE services are used to develop and deploy industrial applications to a plant environment.

As noted above, some embodiments of IDE system 902 can be embodied on a cloud platform. FIG. 15 is a diagram illustrating an example architecture in which cloud-based IDE services 1502 are used to develop and deploy industrial applications to a plant environment. In this example, the industrial environment includes one or more industrial controllers 118, HMI terminals 114, motor drives 1410, servers 1510 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 1510 reside on a separate office network 108 that is connected to the plant network 116 (e.g., through a router 1508 or other network infrastructure device).

In this example, IDE system 902 resides on a cloud platform 1506 and executes as a set of cloud-based IDE service 1502 that are accessible to authorized remote client devices 1204. Cloud platform 1506 can be any infrastructure that allows shared computing services (such as IDE services 1502) to be accessed and utilized by cloud-capable devices. Cloud platform 1506 can be a public cloud accessible via the Internet by devices 1204 having Internet connectivity and appropriate authorizations to utilize the IDE services 1502. In some scenarios, cloud platform 1506 can be provided by a cloud provider as a platform-as-a-service (PaaS), and the IDE services 1502 can reside and execute on the cloud platform 1506 as a cloud-based service. In some such configurations, access to the cloud platform 1506 and associated IDE services 1502 can be provided to customers as a subscription service by an owner of the IDE services 1502. Alternatively, cloud platform 1506 can be a private cloud operated internally by the industrial enterprise (the owner of the plant facility). An example private cloud platform can comprise a set of servers hosting the IDE services 1502 and residing on a corporate network protected by a firewall.

Cloud-based implementations of IDE system 902 can facilitate collaborative development by multiple remote developers who are authorized to access the IDE services 1502. When a system project 1002 is ready for deployment, the project 1002 can be commissioned to the plant facility via a secure connection between the office network 108 or the plant network 116 and the cloud platform 1506. As discussed above, the industrial IDE services 1502 can translate system project 1002 to one or more appropriate executable files—control program files 1402, visualization applications 1404, device configuration files 1408, system configuration files 1512—and deploy these files to the appropriate devices in the plant facility to facilitate implementation of the automation project.

Figure 16:
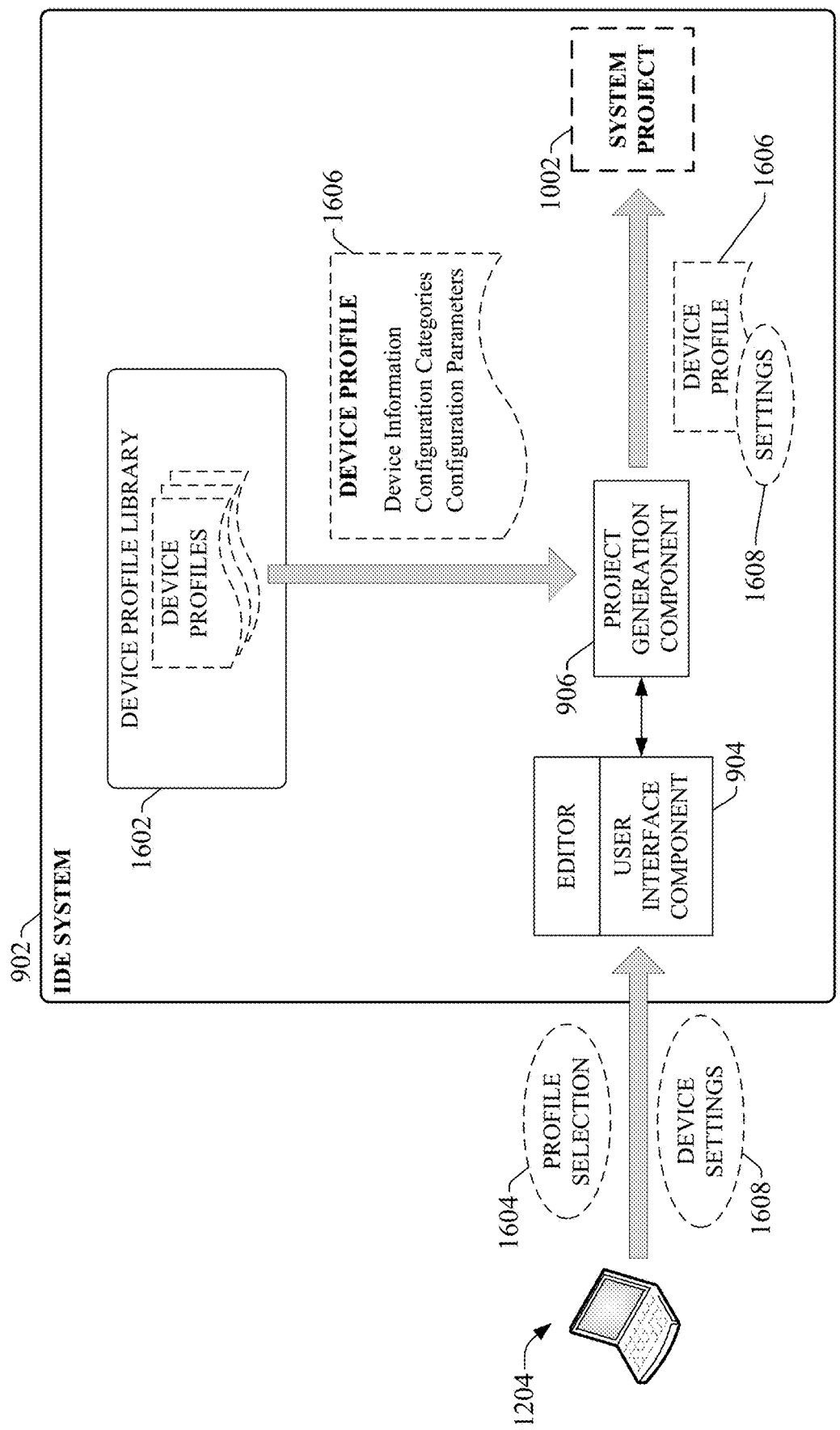
FIG. 16 is a diagram illustrating configuration of device parameters using device profiles.

Some embodiments of the industrial IDE system 902 can support the use of device profiles to facilitate setting values of configurable device parameters for devices that are to be included in the automation project. FIG. 16 is a diagram illustrating configuration of device parameters using device profiles 1606. In general, each device profile 1606 corresponds to a device type, and is a re-usable object or file that defines a set of configurable device parameters—e.g., network or communication settings, scale factors, input or output signal types, operating mode settings, tuning parameter values, maximum or minimum values, refresh rates, channel configurations, etc.—for its corresponding device type. Each device profile 1606 can organize these device configuration parameters into categories to assist the user in locating a desired parameter. The device profile 1606 can also record general information about the device, some of which can be modified by the user to customize a generic device type to reflect a specific device (an instance of the device type).

The IDE system 902 can store device profiles 1606 for multiple types of devices in a device profile library 1602 for selective inclusion in system projects 1002. Device profiles 1606 can be defined for a variety of different industrial devices or systems, including but not limited to industrial controller modules (e.g., analog or digital input and output modules, networking or scanner modules, special function modules, etc.), variable frequency drives, telemetry devices, safety relays, vision systems, or other such devices.

As illustrated in FIG. 16, during development of a system project 1002, a user can interact with the IDE system's development interface to select a device profile 1606 to be added to the project 1002. The selected profile 1606 typically corresponds to a type of device that will be included in the automation system for which the project 1002 is being developed. Once a selected device profile 1606 has been added to the system project 1002 (via submission of profile selection input 1604), the user can invoke device configuration interfaces defined by the device profile 1606 and interact with these configuration interfaces to set values of device parameters or settings 1608 for the device represented by the profile 1606. When the system project 1002 is subsequently deployed to the industrial controller 118 or other devices that make up the automation system (as illustrated in FIGS. 14 and 15), the device configuration settings 1608 that had been submitted by the user are written to corresponding registers of the relevant field devices (e.g., the industrial controller 118 in the case of I/O modules or smart devices connected to the controller 118, or other target devices that are subject to the device settings).

Figure 17:
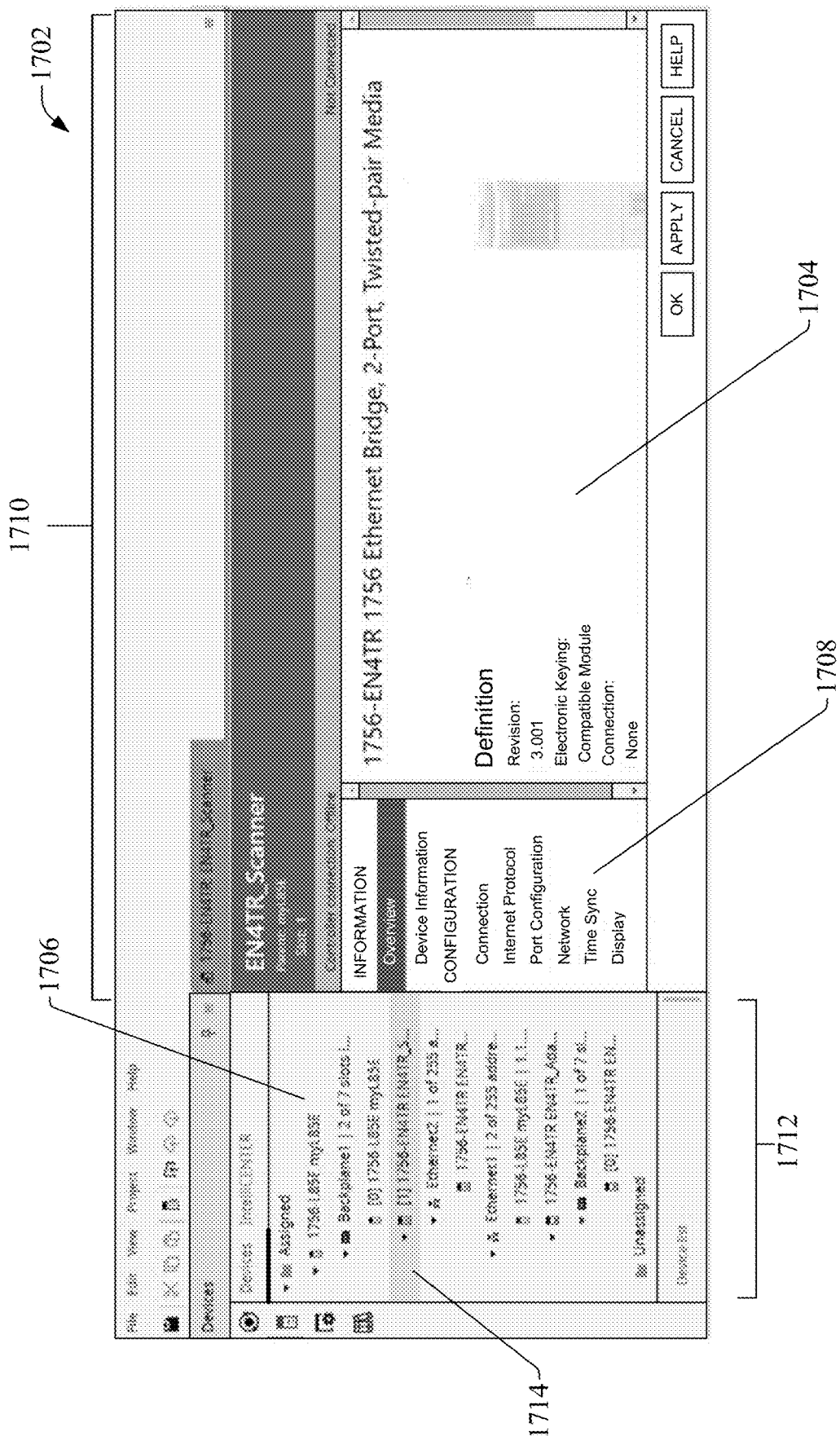
FIG. 17 is an example development interface that can be rendered on a client device by the industrial IDE system's user interface component.

FIG. 17 is an example development interface 1702 that can be rendered on a client device by the industrial IDE system's user interface component 904. Development interface 1702 is organized into panels and workspaces for navigating and editing the system project 1702. The example interface 1702 depicted in FIG. 17 comprises a main workspace area 1710 that serves as the IDE system's primary work area and an explorer panel 1712 located adjacent to the main workspace area 1710. The explorer panel 1712 displays a project tree 1706 comprising a hierarchical arrangement of selectable nodes representing elements of the system project 1702 being developed. In general, selection of a project element from the project tree 1706 causes the main workspace area 1710 to render project content corresponding to the selected element, such as ladder logic or other types of control code, program routines, controller tag definitions, device configuration information, or other aspects of the project 1702. The user can interact with these project elements within the main workspace area 1710 to perform such development functions as writing or editing controller code (e.g., ladder logic, function block diagrams, structured text, etc.), configuring device parameter settings, defining controller tags, or other such project development functions.

Figure 18:
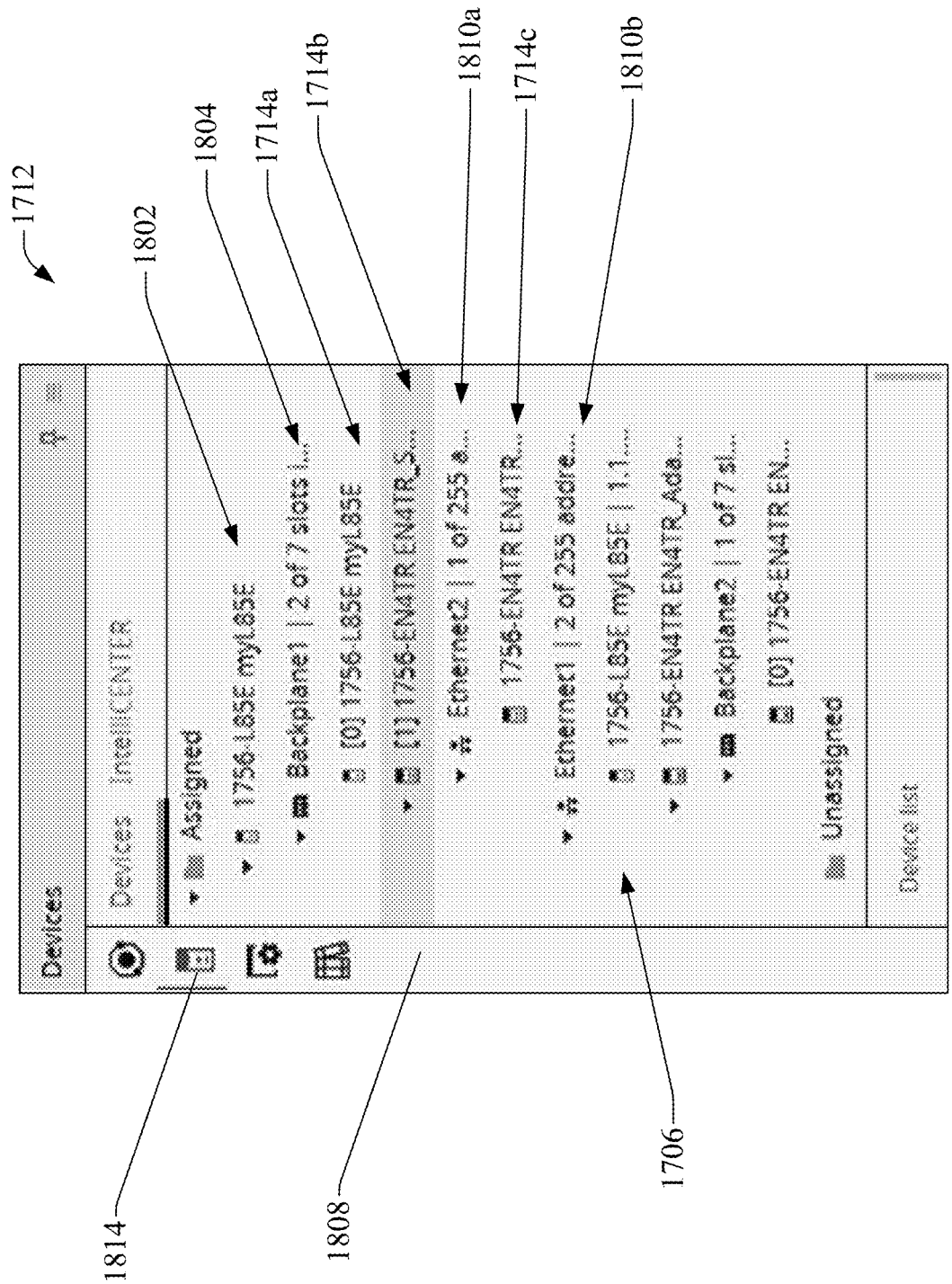
FIG. 18 is a view of an explorer panel and its associated project tree in isolation.

FIG. 18 is a view of the explorer panel 1712 and its associated project tree 1706 in isolation. As noted above, explorer panel 1712 serves as a means for navigating and viewing content of a system project 1002 and supports various ways for performing this navigation. Selectable viewing categories are rendered as selectable explorer icons in a control bar 1808 pinned to the left-side edge of the explorer panel 1712. Selection of an explorer icon from the control bar 1808 sets the type of project content to be browsed via the Explorer panel 1712. In the scenario depicted in FIG. 18, a Devices view icon 1814 has been selected in the control bar 1808, causing the explorer panel 1712 to display, as the project tree 1706, a hierarchical arrangement of device nodes 1714 representing the devices defined for the system project 1002.

For an example system project 1002, the project tree 1706 can include a controller node 1802 representing an industrial controller 118 to be programmed as part of the system project 1002. A backplane node 1804 is defined as a child node of the controller node 1802 and represents the backplane of the industrial controller 118 on which one or more devices or modules will be installed. Any modules or devices to be connected to the controller's backplane are represented as device nodes 1714 below the backplane node 1804. Example devices that can be associated with the controller can include, but are not limited to, digital or analog input modules, digital or analog output modules, networking or scanning modules, analytic modules, special function modules, smart industrial devices, motor drives such as variable frequency drives, or other such devices. Per the workflow illustrated in FIG. 16, a user can add a new device to the project by adding a new device node 1714— representing a device profile 1606 for the type of the device—to the project tree 1706. Any suitable interaction can be used to add a new device to the project tree 1706. For example, the user may select the backplane node 1804 and invoke a device profile selection window (e.g., by right-clicking on the backplane node 1804) that displays a list of available types of devices that can be added to the project 1002. Each device type has a corresponding device profile 1606 stored in the system's device profile library 1602. The device profile 1606 defines information about the corresponding device type, as well as any device parameters associated with the device type whose values can be set by the user.

The explorer icons rendered on the control bar 1808 can also include an Application icon that causes the explorer panel 1712 to display a list of applications—e.g., industrial control programs such as ladder logic routines—that make up the system project 1002. This viewing mode allows the user to develop, view, and edit control programs within the main workspace area 1710. These control programs will be installed and executed on the industrial controller 118.

Returning to FIG. 17, selecting a device node 1714 in the project tree 1706 causes the main workspace area 1710 to display an interactive device configuration interface for viewing and editing configuration parameters for the selected device. Device information and configurable device parameters displayed on this device configuration interface are defined by the device profile 1606 for the selected device. In the example depicted in FIG. 17, the device configuration interface comprises a main configuration area 1704 and a category window 1708 that lists various informational and configuration categories for the device. Selecting a category from this window 1708 causes the main device configuration area 1704 to render information or configurable device parameters relating to the selected category.

Informational categories listed in the category window 1708 can include an Overview category and a more detailed Device Information category. Selection of the Overview category can cause summary information about the device— e.g., model number and revision number of the device, device type, a type of electronic keying, or other such information—to be rendered in the main workspace area 1710. In the example depicted in FIG. 17, the user has selected a device node 1714 representing an ethernet bridge module that will be installed on the controller's backplane, and has selected the Overview category within the category window 1708 so that general overview information for the module can be viewed.

Figure 19:
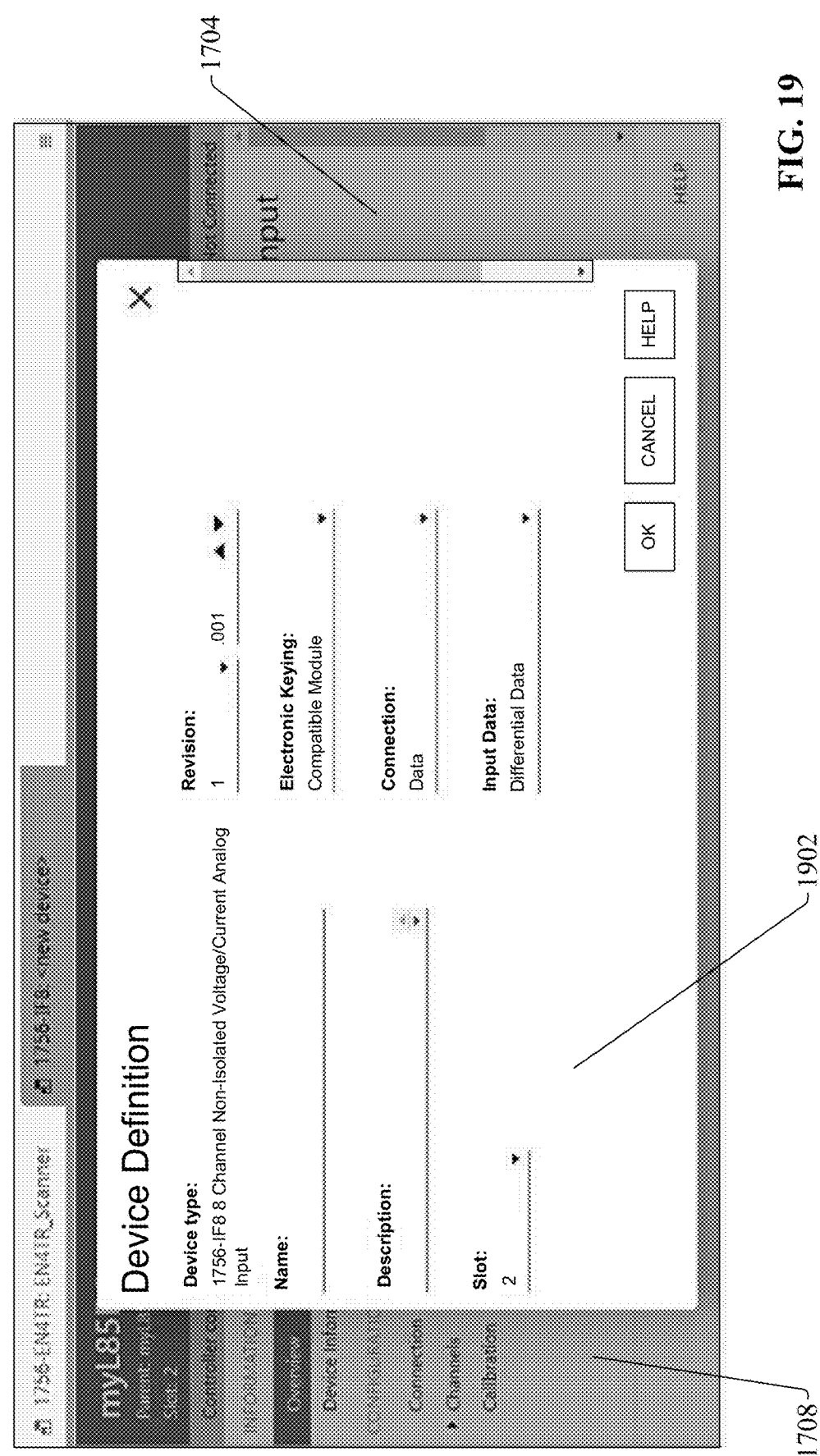
FIG. 19 is a view of a main workspace area in which a Device Information editing window has been invoked for a selected device.

Depending on the type of device, some of the device information accessible via the Overview or Device Information categories can be edited by the user. FIG. 19 is a view of the main workspace area 1710 in which a Device Information editing window 1902 has been invoked for the selected device. This window 1902 includes data fields that allow the user to enter or edit various items of information about the device, including but not limited to a name of the device, a description of the device, a controller slot number in which the device is to be installed (if the device is a module to be installed on a controller backplane), revision information, a type of electronic keying, a type of connection, a type of input data, or other such information.

Figure 20A:
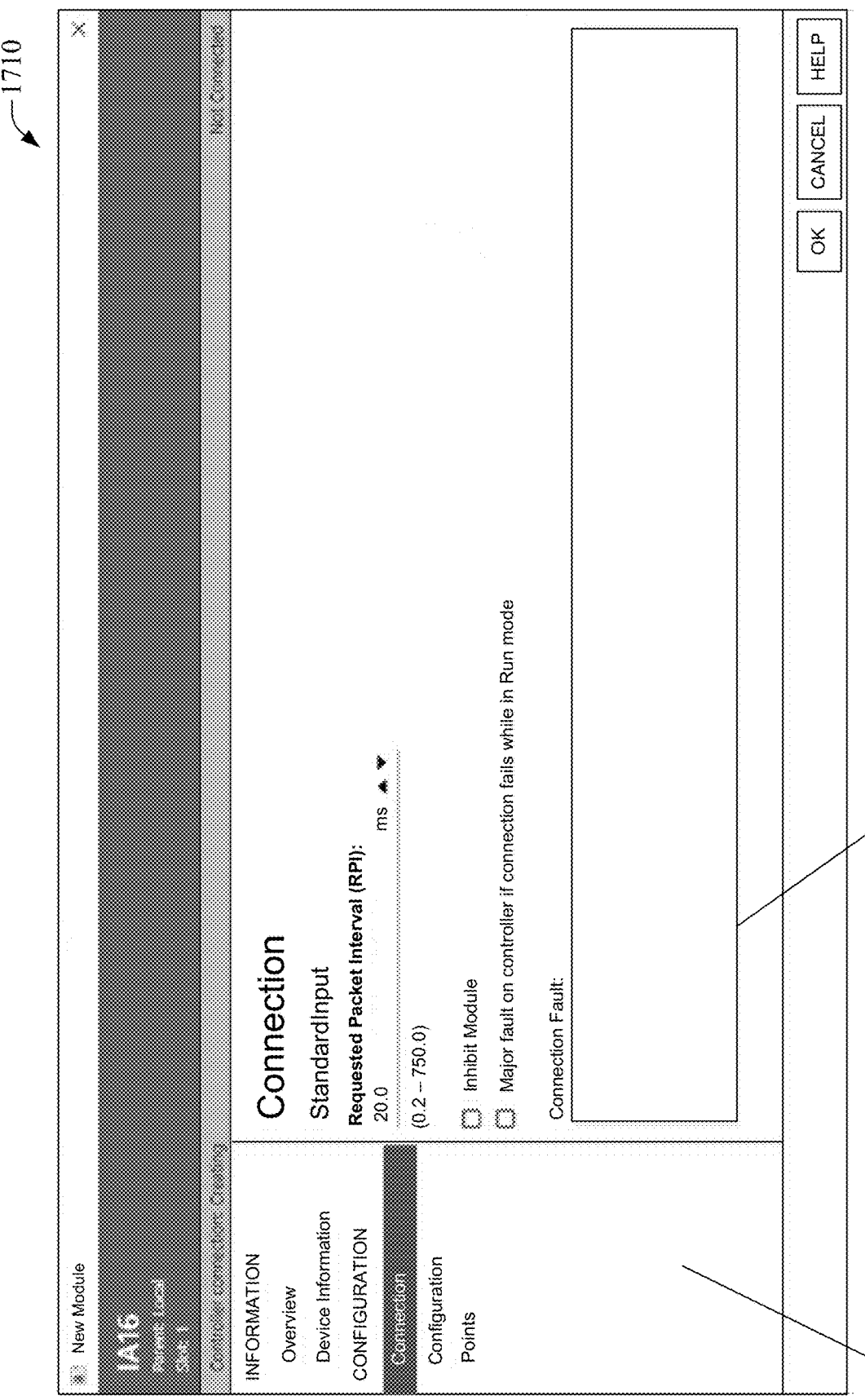
FIG. 20a is a view of a main workspace area of a device profile interface in which the user has selected a 16-point digital input module.

Returning again to FIG. 17, configuration categories listed in the category window 1708 can include, for example, a Connection category, an Internet Protocol category, a Port Configuration category, a Network category, a Time Sync category, a Display category, a Channels category, a Calibration category, an I/O points category, or other such configuration categories. The available configuration categories, as well as the specific parameters that are accessible under each category, can depend on the type of device being viewed. For example, FIG. 13*a* is a view of the main workspace area 1710 in which the user has selected a 16-point digital input module. Available configuration categories listed in the Category window 1708 for this type of device include a Connection category, a Configuration category, and a Points category. The Connection category has been selected in FIG. 20*a*, causing the configuration area 1704 to display configurable connection parameters for the module. These parameters include a packet interval timing, an indication as to whether the module is to be inhibited, and an indication as to whether a connection failure is to trigger a major fault on the controller 118. The configuration area renders interactive graphical controls—e.g., data entry boxes, drop down selection windows, binary check boxes, etc.—for each configurable parameter to allow the user to enter values of these parameters.

Figure 20B:
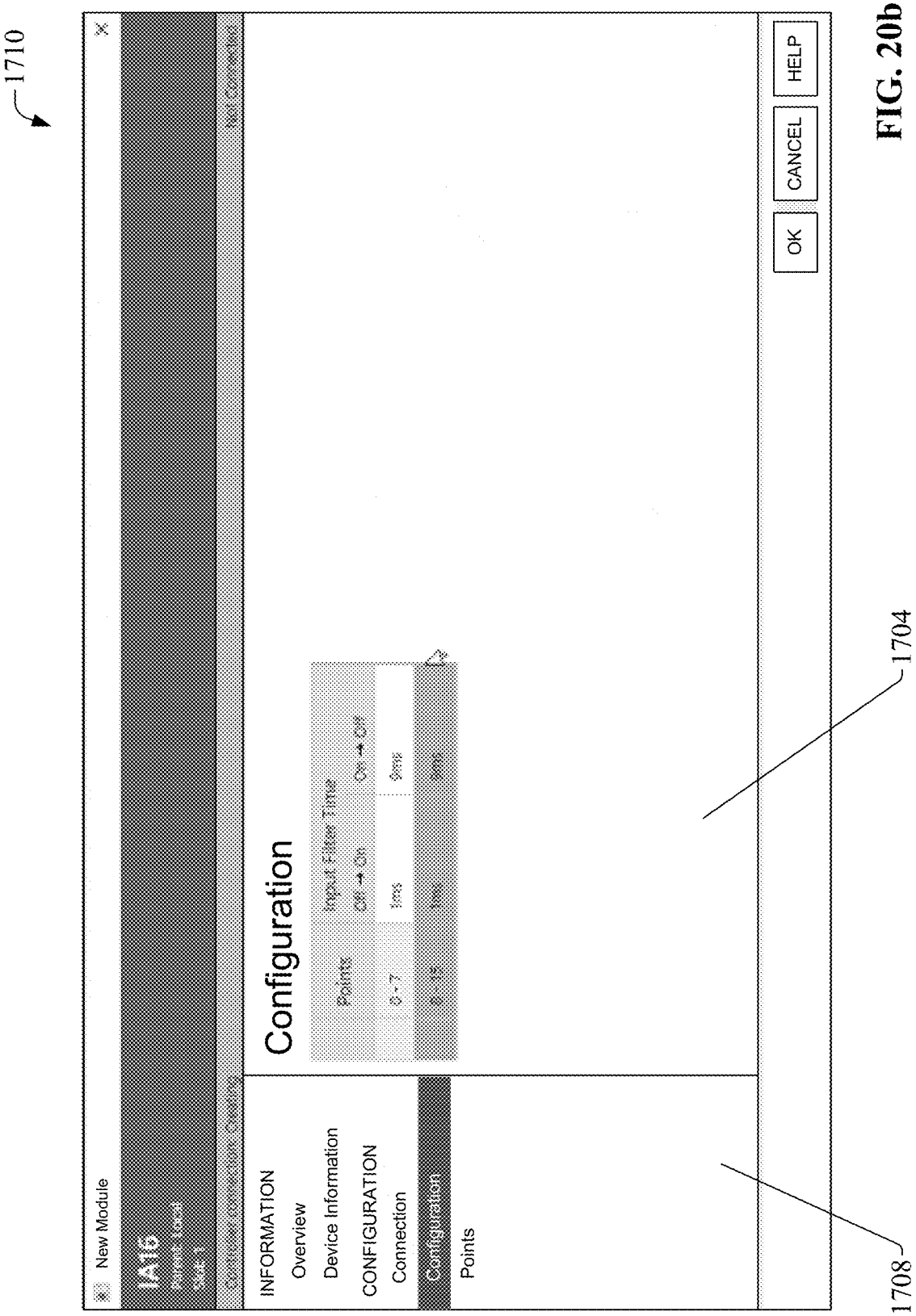
FIG. 20b is a view of the main workspace area of a device profile interface in which the Configuration category has been selected in the Category window.
Figure 20C:
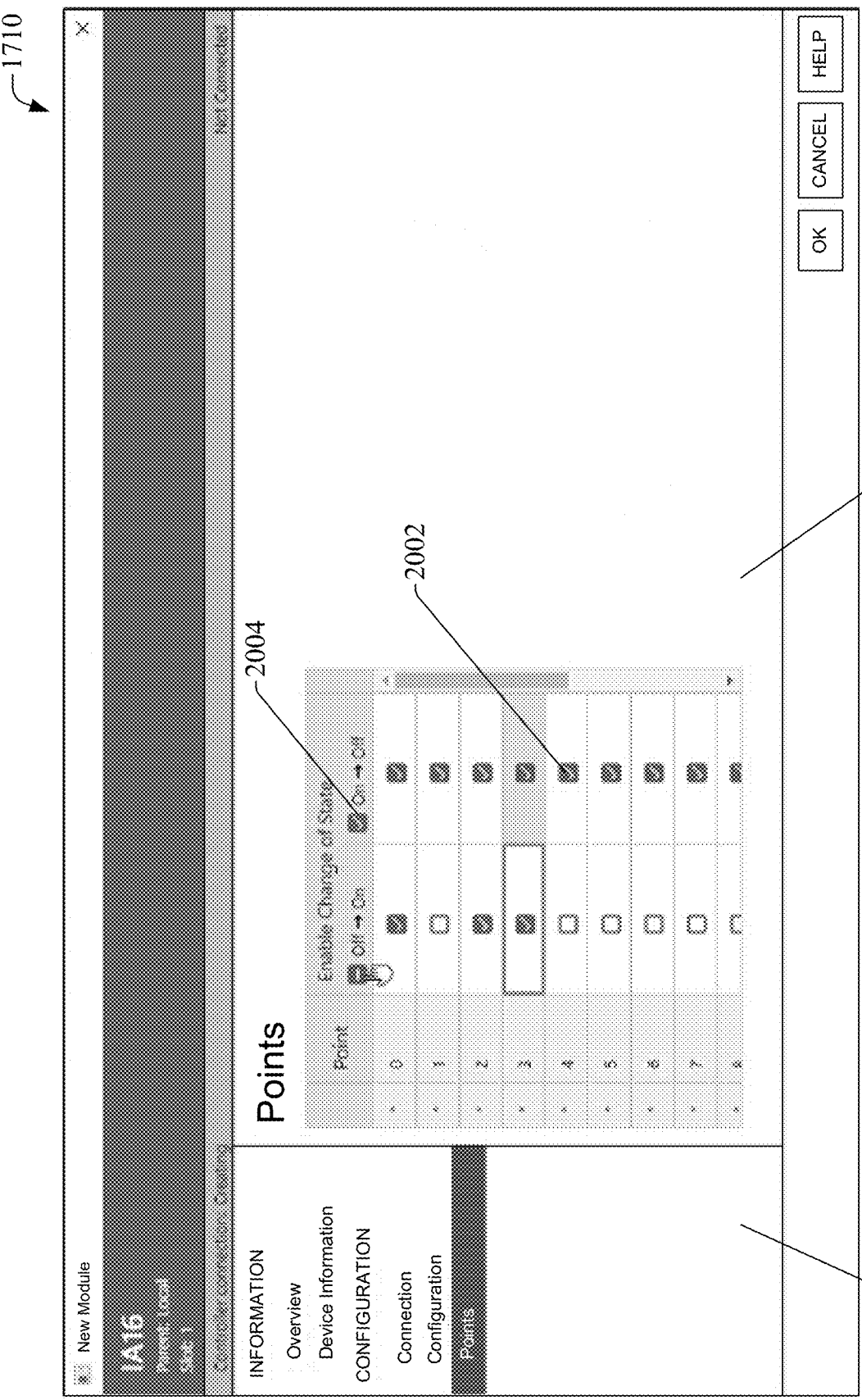
FIG. 20c is a view of the main workspace area of a device profile interface in which the Points category has been selected in the Category window.

FIG. 20*b* is a view of the main workspace area 1710 in which the Configuration category has been selected in the Category window 1708. For the selected analog input module, selecting this category causes the configuration area 1704 to display an interactive table that allows the user to set input filter times for groups of input points. FIG. 20*c* is a view of the main workspace area 1710 in which the Points category has been selected in the Category window 1708. This invokes another interactive table in the configuration area 1704 that allows the user to selectively enable or disable changes of state—both on-to-off and off-to-on transitions— for each input point of the module. In contrast to generic table-based interfaces, this graphical configuration interface comprises both individual checkbox controls 2002 that allow the user to enable or disable state changes for individual input points, as well as global checkbox controls 2004 that allow the user to enable or disable state changes for all of the module's input points with a single selection input.

Figure 21A:
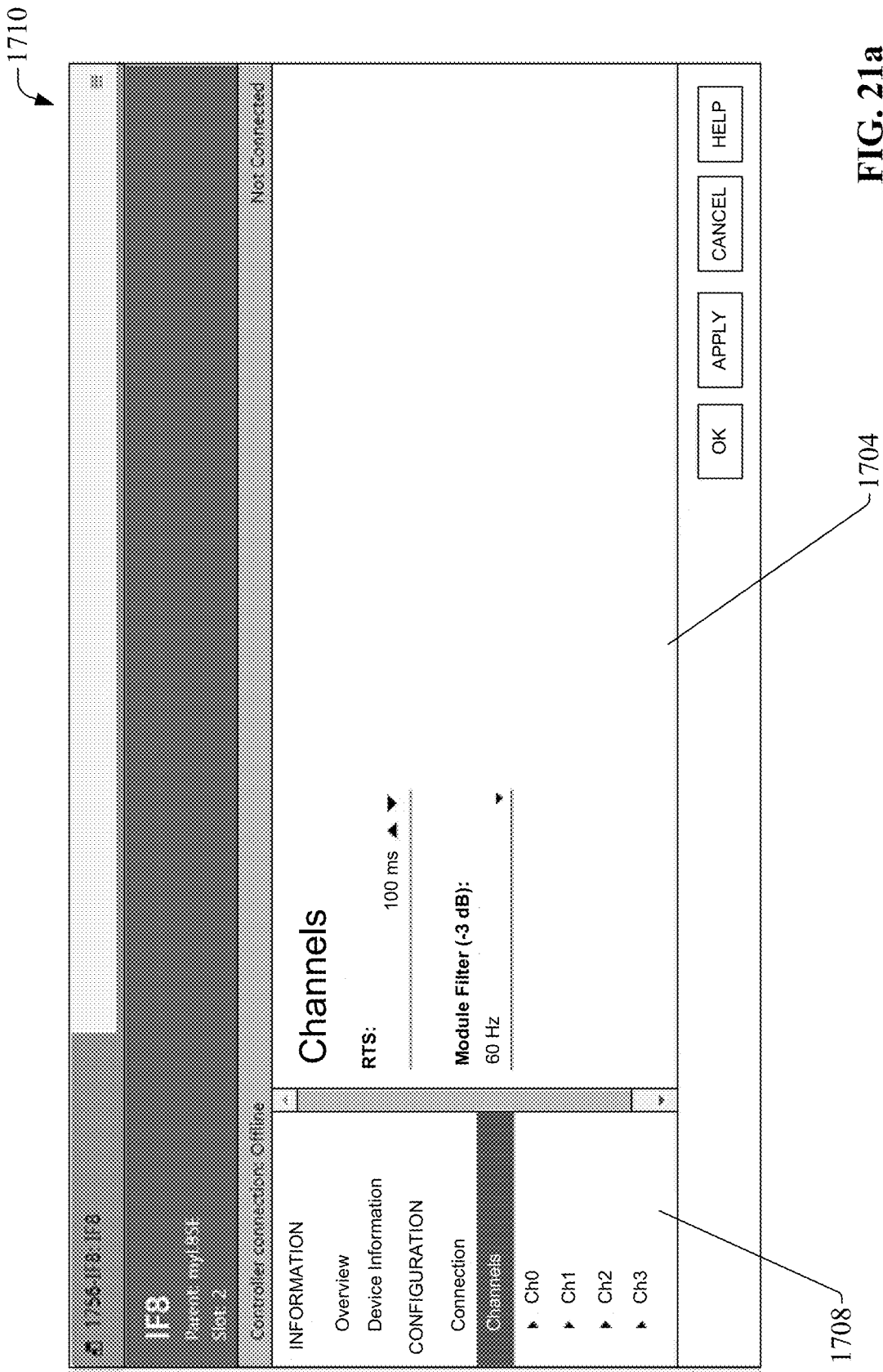
FIG. 21a is a view of the main workspace area of a device profile interface in which an 8-channel analog input module has been selected.
Figure 21B:
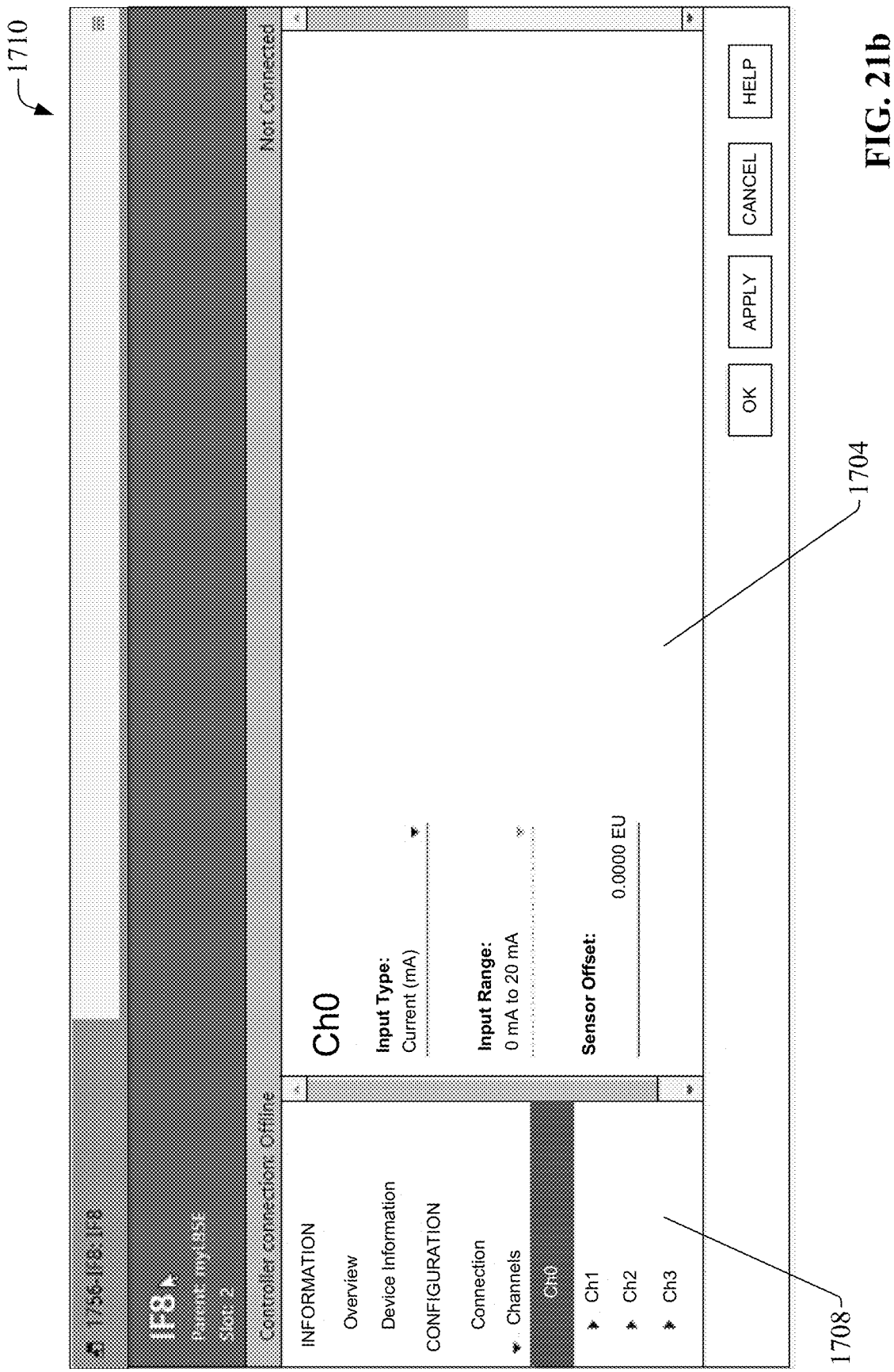
FIG. 21b is a view of the main workspace area of a device profile interface in which a user has selected to set configuration parameters for individual channels of an input module.
Figure 21C:
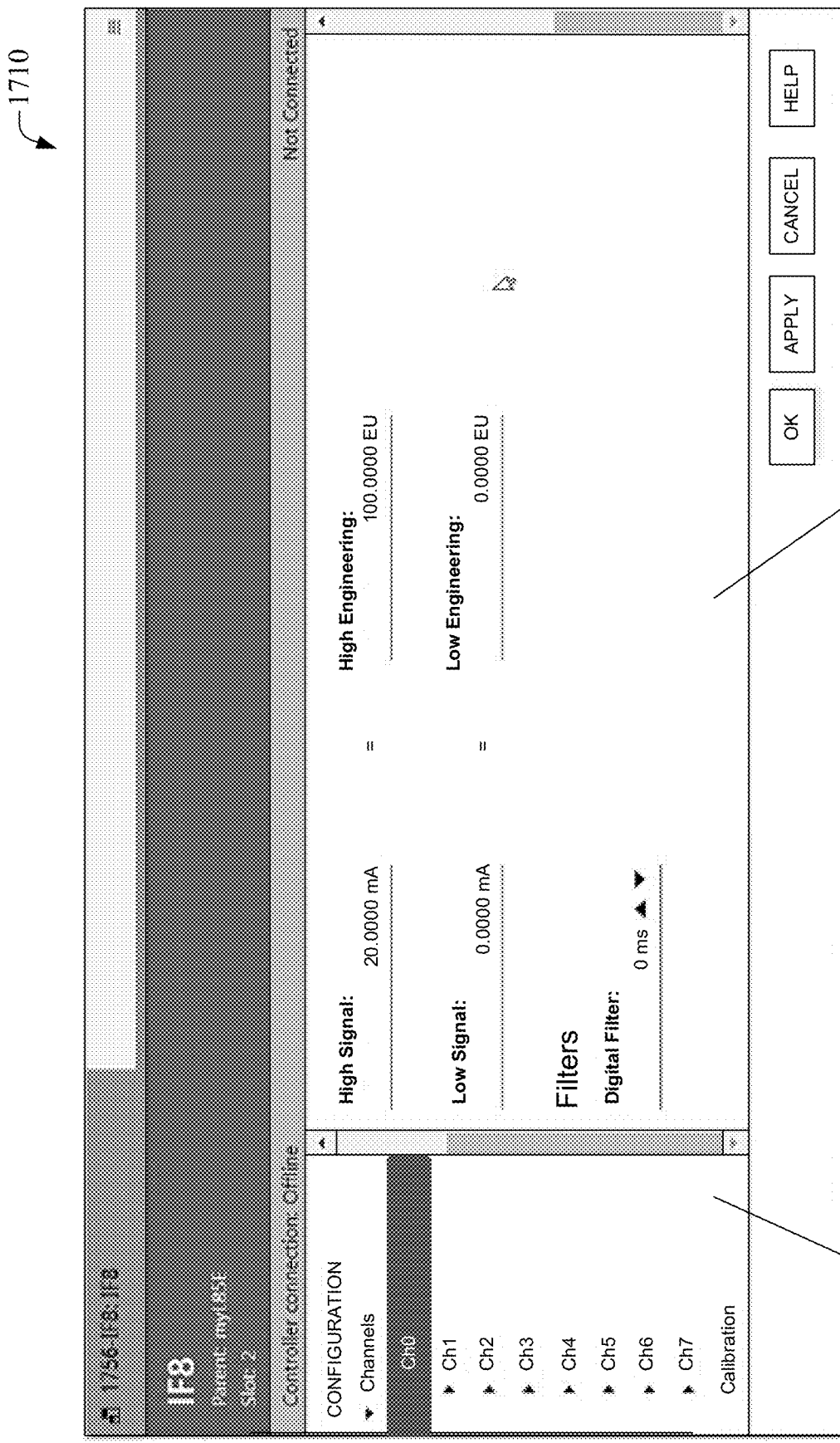
FIG. 21c is another view of the main workspace area of a device profile interface in which a user has selected to set configuration parameters for individual channels of an input module.

As noted above, the device profile 1606 for the device being configured defines the configuration parameters that will be presented for viewing and editing in the main workspace area. FIG. 21*a* is a view of the main workspace area 1710 in which another type of device—an 8-channel analog input module—has been selected. In this scenario, the configuration categories listed in the Category window 1708 include a Channels category for configuring the analog input channels of the module. General channel parameters that are applicable to all channels—including the real time sampling (RTS) period and the module filter frequency—are rendered in the configuration area 1704 and can be edited by the user. In addition, configuration parameters for each individual channel can be set within the configuration area 1704, as shown in FIGS. 21*b* and 21*c*. These channel-specific parameters can include, but are not limited to, a type of input signal provided to the channel (e.g., current or voltage), a range of the input signal (e.g., 4-20 milliamp, 0-10 volts, etc.), an offset value for the channel, high and low input signal limits, digital filter value, or other such configuration settings.

In some embodiments, the IDE system 902 can be configured to generate dynamic feedback in response to determining that the user has submitted a device configuration parameter value that is not within a valid range for the edited parameter. In this regard, some device profiles 1606 can define ranges of valid values for respective device parameters. As the user submits device configuration parameter values, the project generation component 906 can verify that each parameter value submitted by the user is within the valid ranges. If the user enters a parameter value that is outside that parameter's valid range, the user interface component 904 can render a notification on the development interface 1702 indicating that the value entered by the user is invalid. The project generation component 1606 can reject any submitted parameter values that are outside their valid ranges.

The device configuration interfaces illustrated in FIGS. 17-21c and described above provide an intuitive interface for configuring industrial devices used in the system project 1002. The device profile library 1602 can store device profiles 1606 for devices offered by multiple different device vendors, and the IDE system's interface allows these devices to be configured using a common device configuration workflow regardless of device vendor. The graphical device configuration interfaces generated by the IDE system 902 offer a more intuitive configuration workflow relative to more generic table-based device configuration interfaces. In some embodiments, the IDE system 902 can generate the device configuration interfaces using a web-based format, such as hypertext markup language (HTML), allowing the interfaces to be executed on a cloud platform or internet server and served to any type of device that supports web browsing. This format also allows the resulting device configuration interfaces to support a greater degree of customization relative to simple text-based device configuration profiles.

When developing a system project 1002 in the IDE system 902, the user typically builds the project tree 1706—e.g., by addition, arrangement, and configuration of device profiles 1606—to reflect the physical device topology of the control system for which the project 1002 is being developed (see FIGS. 16-18). The project generation component 906 can then generate the system project 1002 based in part on this defined topology as well as device configuration settings and control programming assigned to the respective devices by the user.

Figure 22:
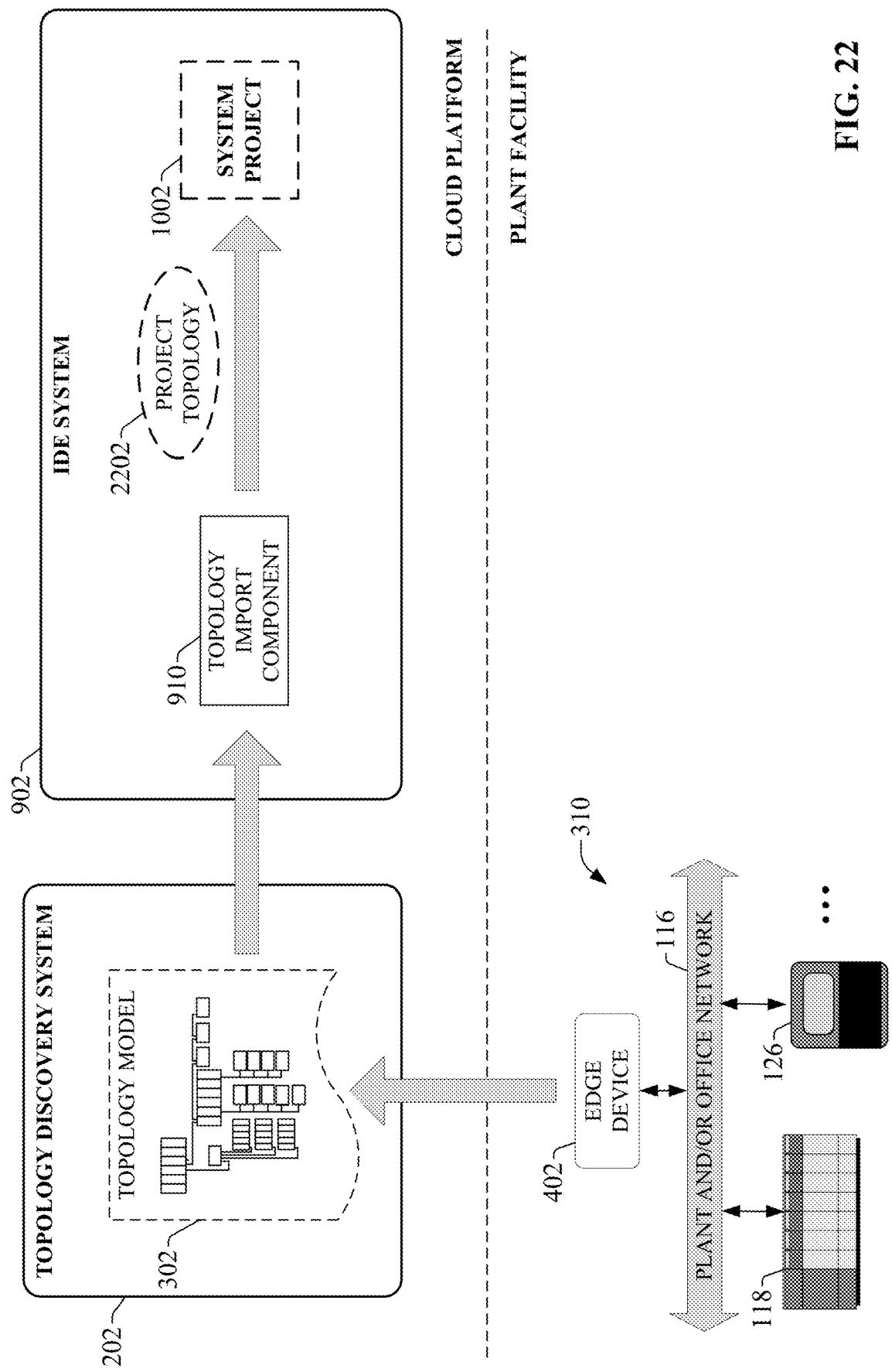
FIG. 22 is a diagram illustrating importing of a topology model by the IDE system.

As an alternative to defining or editing the project topology directly via interaction with the project tree 1706—e.g., by manually selecting and adding device profiles and communication busses to the project tree 1706—some embodiments of the IDE system 902 can import the topology model 302 generated by the topology discovery system 202, and generate the project tree 1706 and other elements of the system project 1002 based on the model 302. FIG. 22 is a diagram illustrating importing of the topology model 302 by the IDE system 902. In this example, topology discovery system 202 has generated a topology model 302 using the agent-based discovery process described above. The topology model 302 records the devices, networks, busses, and communication paths of an automation system 310 in operation at a plant facility.

A developer may wish to develop a control system project 1002 for a similar automation system to be deployed elsewhere in the facility or at another facility. In another example scenario, the developer may wish to upgrade the control system for the existing automation system 310, and as part of this upgrade may require a new system project 1002 to be developed that can be executed on the monitoring and control devices of the automation system 310. The topology model 302 can be leveraged by the IDE system 902 to automatically generate portions of the system project 1002 to reflect the devices and communication paths that exist in the physical automation system 310.

The IDE system 902 can include a topology import component 910 configured to interface with the topology discovery system 202 and import the topology model 302 into the system project 1002. In the illustrated example, both the IDE system 902 and topology discovery system 202 reside and execute on a cloud platform. The IDE system 902 can allow a developer to browse, view, and import any topology models 302 stored on the topology discovery system 202 in association with the industrial enterprise with which the developer is affiliated. The topology import component 910 can retrieve the selected topology model 302, translate the model 302 to a project topology 2202 understandable by the IDE system 902, and integrate the project topology 2202 into a new or existing system project 1002. This can include generating the project tree 1706 for the project based on the project topology 2202, such that the project tree 1706 reflects the physical topology of devices defined by the topology model 302. As part of the translation, the topology import component 910 can add device nodes 1714 corresponding to any devices defined in the topology model 302 to the project tree 1706 (see FIG. 18), and can also add corresponding device profiles 1606 for each device node 1714 to the system project 1002. Device configuration information obtained from the topology model 310 can also be used by the topology import component 910 to configure the device profiles 1606 for respective devices nodes 1714 (e.g., device name, network address, port configurations, etc.). The topology import component 910 can also add bus nodes 1810 (see FIG. 18) corresponding to any networks defined in the topology model 302 to the topology tree 1706, and organize the device nodes 1714 and bus nodes 1810 to reflect the communication pathways between devices as defined by the topology model 310.

Once the project tree 1706 has been generated and corresponding device profiles 1606 have been added to the system project 1002 based on the topology model 302, the developer can edit the resulting system project 1002 as needed to add or remove devices, add or edit control program, modify device configurations, or perform other such project edits. It is to be appreciated that the topology model 302 is not limited to use with industrial development platforms having the functionalities of IDE system 902 described herein, and can be imported into other types of industrial development platforms and translated into portions of industrial control system programming or device configurations.

Using the topology model 302 to automatically generate portions of a control system project 1002 can significantly reduce development time and effort, and can also ensure that new control system projects 1002 accurately conform to the topology of devices and network connections of a physical automation system.

The agent-based topology discovery system 202 described herein can accurately document devices and networks that make up an enterprise's automation systems in a substantially autonomous manner. By deploying diverse discovery agents capable of executing respective different discovery strategies, and orchestrating the behavior of these agents as new information about the control system topology is received, the system can generate and maintain an accurate topology model of an enterprise's physical control systems with minimal guidance from an administrator. The resulting model can be leveraged by a range of applications that utilize control system information, including but not limited to inventory tracking and querying, backup and restore systems, risk or security analysis applications, control application development platforms, or other such applications.

Figure 23:
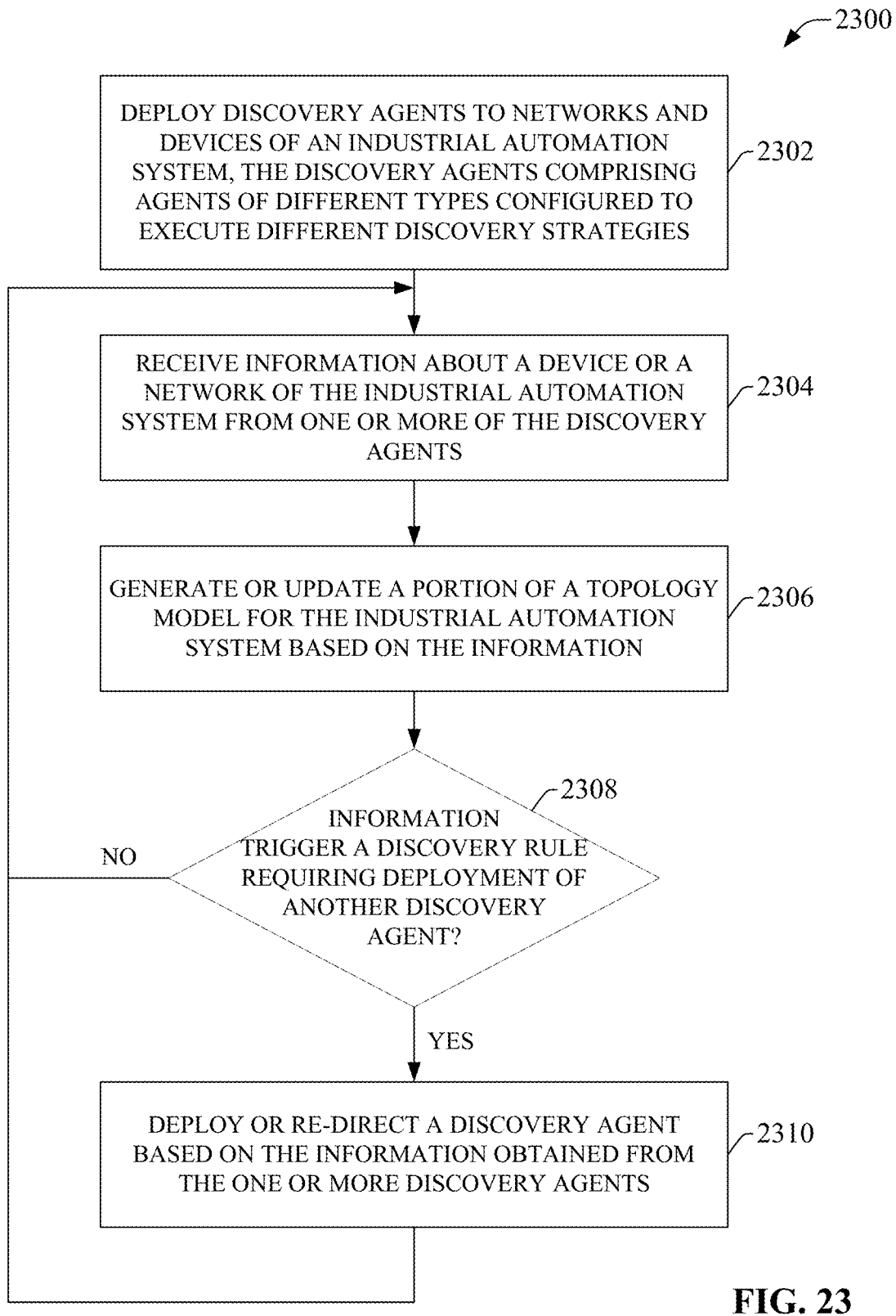
FIG. 23 is a flowchart of an example methodology for autonomously generating a topology model of an industrial automation system.
Figure 24:
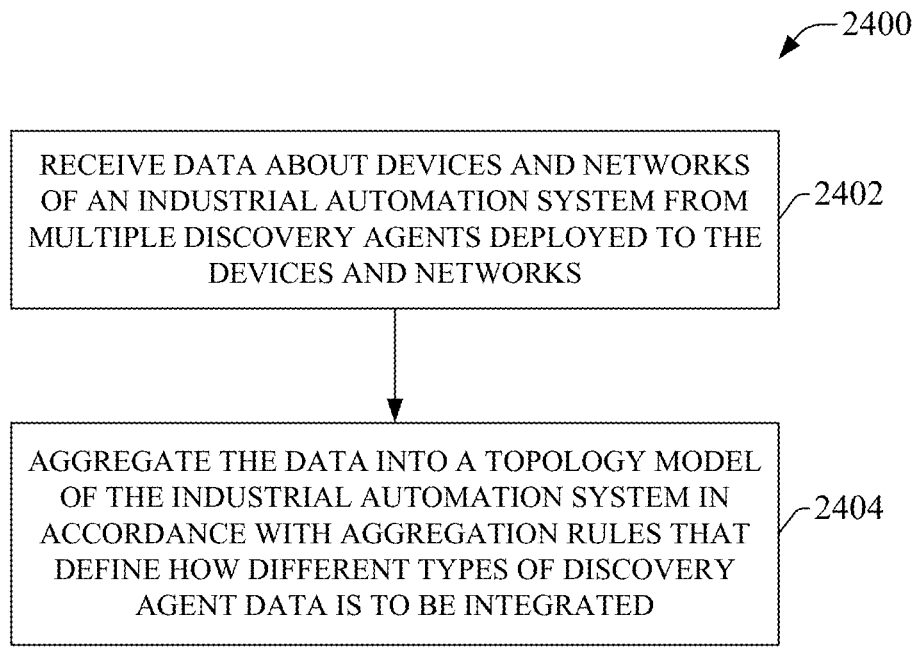
FIG. 24 is a flowchart of an example methodology for aggregating information received from diverse types of discovery agents to yield a topology model of an industrial automation system.

FIGS. 23-24 illustrate example methodologies in accordance with one or more embodiments of the subject application. While, for purposes of simplicity of explanation, the methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 23 illustrates an example methodology 2300 for autonomously generating a topology model of an industrial automation system. Initially, at 2302, discovery agents are deployed to networks and devices of an industrial automation system. The discovery agents can comprise agents of different types that are configured to execute respective different discovery strategies. For example, various types of discovery agents can be configured to probe specific types of industrial or network devices for identity and configuration information, or can be configured to support specific communication or handshaking protocols for obtaining information from devices that support those protocols. A given discovery agents can be configured to execute either a passive monitoring of a portion of the automation system (e.g., passive monitoring of network traffic across a network segment) or active polling of devices that make up the automation system.

At 2304, information about a device or network of the automation system is received from one or more of the discovery agents. This information can comprise, for example, network addresses that are communicating with one another over a network, identities of specific discovered devices, device configuration settings (including identities of other devices that a discovered device is configured to communicate with), or other such information.

At 2306, a portion of a topology model for the automation system is updated or generated based on the information received at step 2304. The topology model can record the identities and configurations of devices discovered to be part of the automation system, communication paths between pairs of the devices, information about networks or communication busses over which the devices communicate, or other such topology information.

At 2308, a determination is made as to whether the information received at step 2304 triggers a defined discovery rule requiring deployment or redirection of another discovery agent. Discovery rules can define follow-up discovery strategies to be executed in response to receipt of specified types of discovered topology information. For example, the discovery rules may specify that, in response to discovering data traffic on a network indicative of two network addresses exchanging data across the network, discovery agents configured to probe network addresses for device identity information are to be deployed in order to discover the types of devices that are communicating with one another. The discovery rules may also specify that, in response to receiving information identifying a type of one of the devices, another discovery agent configured to probe devices corresponding to that device is to be deployed in order to collect configuration information for the device. Other types of discovery rules are also within the scope of one or more embodiments.

If the received information does not trigger a discovery rule (NO at step 2308), the methodology returns to step 2304, and steps 2304-2308 are repeated. If the information received at step 2304 triggers a discovery rule (YES at step 2308), the methodology proceeds to step 2310, where another discovery agent is deployed or re-directed based on the information obtained from the one or more discovery agents 2310. The methodology then returns to step 2304, and steps 2304-2308 repeat.

Methodology 2300 can be executed by a cloud-based topology system and used to digitally model the physical automation systems at one or more industrial facilities. The methodology 2300 can be configured to execute continuously or periodically according to a defined frequency, depending on such factors as the need to conserve processing and communication bandwidth or the criticality of updating the topology model in a timely manner when changes to the automation system are implemented.

FIG. 24 illustrates an example methodology 2400 for aggregating information received from diverse types of discovery agents to yield a topology model of an industrial automation system. Initially, at 2402, data about devices and networks of an industrial automation system is received from multiple discovery agents deployed to the devices and networks. The type of data received can depend on the type of discovery agent submitting the data. Example types of data that can be received from the agents can include, but are not limited to, discovered network addresses that are communicating across a network, identities or configurations of discovered devices, device network or data port settings, I/O configurations of industrial controllers, or other such information.

At 2404, the data received at step 2402 is aggregated into a topology model of the automation system in accordance with aggregation rules that define how different types of discovery agent data is to be integrated.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 25:
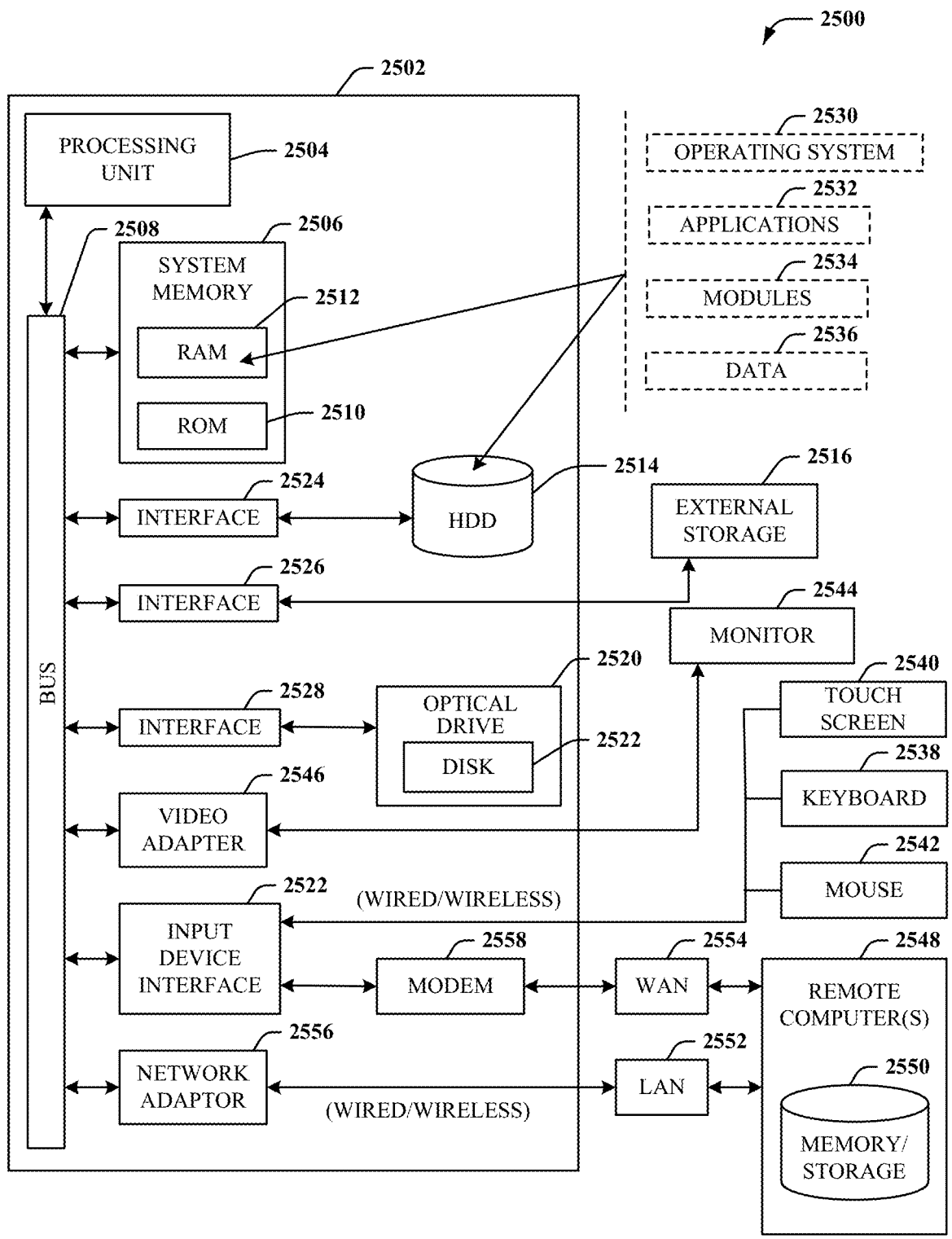
FIG. 25 is an example computing environment.
Figure 26:
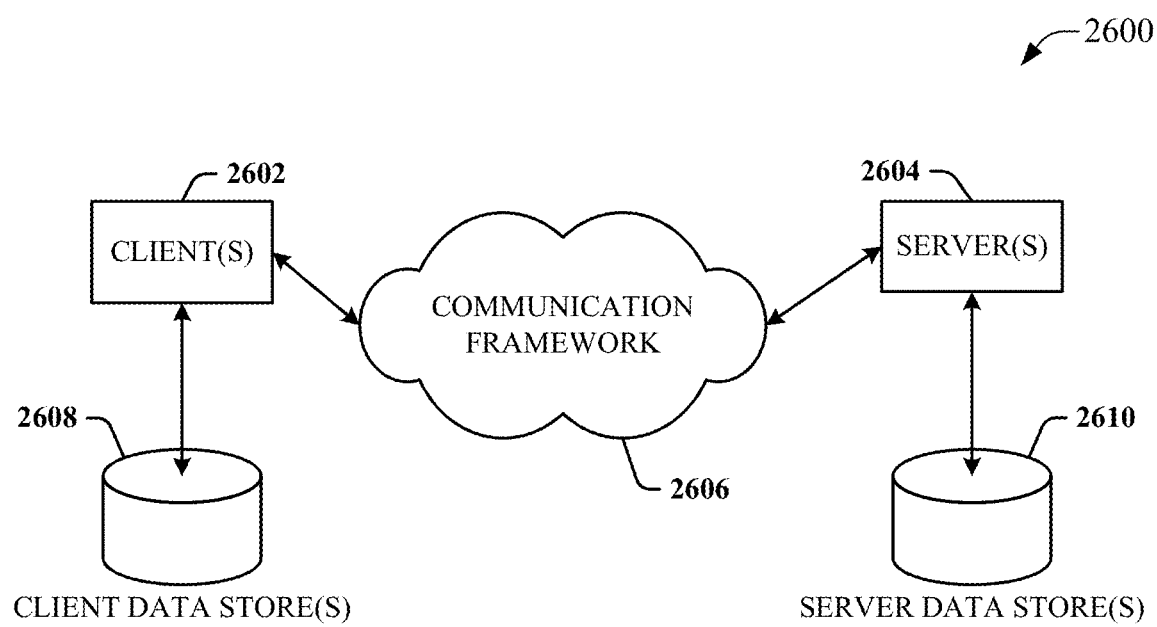
FIG. 26 is an example networking environment.

In order to provide a context for the various aspects of the disclosed subject matter, FIGS. 25 and 26 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 25, the example environment 2500 for implementing various embodiments of the aspects described herein includes a computer 2502, the computer 2502 including a processing unit 2504, a system memory 2506 and a system bus 2508. The system bus 2508 couples system components including, but not limited to, the system memory 2506 to the processing unit 2504. The processing unit 2504 can be any of various commercially available processors. Dual microprocessors and other multi-processor architectures can also be employed as the processing unit 2504.

The system bus 2508 can be any of several types of bus structure that can further interconnect to a memory bus (with or without a memory controller), a peripheral bus, and a local bus using any of a variety of commercially available bus architectures. The system memory 2506 includes ROM 2510 and RAM 2512. A basic input/output system (BIOS) can be stored in a non-volatile memory such as ROM, erasable programmable read only memory (EPROM), EEPROM, which BIOS contains the basic routines that help to transfer information between elements within the computer 2502, such as during startup. The RAM 2512 can also include a high-speed RAM such as static RAM for caching data.

The computer 2502 further includes an internal hard disk drive (HDD) 2514 (e.g., EIDE, SATA), one or more external storage devices 2516 (e.g., a magnetic floppy disk drive (FDD) 2516, a memory stick or flash drive reader, a memory card reader, etc.) and an optical disk drive 2520 (e.g., which can read or write from a CD-ROM disc, a DVD, a BD, etc.). While the internal HDD 2514 is illustrated as located within the computer 2502, the internal HDD 2514 can also be configured for external use in a suitable chassis (not shown). Additionally, while not shown in environment 2500, a solid state drive (SSD) could be used in addition to, or in place of, an HDD 2514. The HDD 2514, external storage device(s) 2516 and optical disk drive 2520 can be connected to the system bus 2508 by an HDD interface 2524, an external storage interface 2526 and an optical drive interface 2528, respectively. The interface 2524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2512, including an operating system 2530, one or more application programs 2532, other program modules 2534 and program data 2536. All or portions of the operating system, applications, modules, and/or data can also be cached in the RAM 2512. The systems and methods described herein can be implemented utilizing various commercially available operating systems or combinations of operating systems.

Computer 2502 can optionally comprise emulation technologies. For example, a hypervisor (not shown) or other intermediary can emulate a hardware environment for operating system 2530, and the emulated hardware can optionally be different from the hardware illustrated in FIG. 25. In such an embodiment, operating system 2530 can comprise one virtual machine (VM) of multiple VMs hosted at computer 2502. Furthermore, operating system 2530 can provide runtime environments, such as the Java runtime environment or the .NET framework, for application programs 2532. Runtime environments are consistent execution environments that allow application programs 2532 to run on any operating system that includes the runtime environment. Similarly, operating system 2530 can support containers, and application programs 2532 can be in the form of containers, which are lightweight, standalone, executable packages of software that include, e.g., code, runtime, system tools, system libraries and settings for an application.

Further, computer 2502 can be enable with a security module, such as a trusted processing module (TPM). For instance with a TPM, boot components hash next in time boot components, and wait for a match of results to secured values, before loading a next boot component. This process can take place at any layer in the code execution stack of computer 2502, e.g., applied at the application execution level or at the operating system (OS) kernel level, thereby enabling security at any level of code execution.

A user can enter commands and information into the computer 2502 through one or more wired/wireless input devices, e.g., a keyboard 2538, a touch screen 2540, and a pointing device, such as a mouse 2542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2504 through an input device interface 2544 that can be coupled to the system bus 2508, but can be connected by other interfaces, such as a parallel port, an IEEE 1394 serial port, a game port, a USB port, an IR interface, a BLUETOOTH® interface, etc.

A monitor 2544 or other type of display device can be also connected to the system bus 2508 via an interface, such as a video adapter 2546. In addition to the monitor 2544, a computer typically includes other peripheral output devices (not shown), such as speakers, printers, etc.

The computer 2502 can operate in a networked environment using logical connections via wired and/or wireless communications to one or more remote computers, such as a remote computer(s) 2548. The remote computer(s) 2548 can be a workstation, a server computer, a router, a personal computer, portable computer, microprocessor-based entertainment appliance, a peer device or other common network node, and typically includes many or all of the elements described relative to the computer 2502, although, for purposes of brevity, only a memory/storage device 2550 is illustrated. The logical connections depicted include wired/wireless connectivity to a local area network (LAN) 2552 and/or larger networks, e.g., a wide area network (WAN) 2554. Such LAN and WAN networking environments are commonplace in offices and companies, and facilitate enterprise-wide computer networks, such as intranets, all of which can connect to a global communications network, e.g., the Internet.

When used in a LAN networking environment, the computer 2502 can be connected to the local network 2552 through a wired and/or wireless communication network interface or adapter 2556. The adapter 2556 can facilitate wired or wireless communication to the LAN 2552, which can also include a wireless access point (AP) disposed thereon for communicating with the adapter 2556 in a wireless mode.

When used in a WAN networking environment, the computer 2502 can include a modem 2558 or can be connected to a communications server on the WAN 2554 via other means for establishing communications over the WAN 2554, such as by way of the Internet. The modem 2558, which can be internal or external and a wired or wireless device, can be connected to the system bus 2508 via the input device interface 2522. In a networked environment, program modules depicted relative to the computer 2502 or portions thereof, can be stored in the remote memory/storage device 2550. It will be appreciated that the network connections shown are example and other means of establishing a communications link between the computers can be used.

When used in either a LAN or WAN networking environment, the computer 2502 can access cloud storage systems or other network-based storage systems in addition to, or in place of, external storage devices 2516 as described above. Generally, a connection between the computer 2502 and a cloud storage system can be established over a LAN 2552 or WAN 2554 e.g., by the adapter 2556 or modem 2558, respectively. Upon connecting the computer 2502 to an associated cloud storage system, the external storage interface 2526 can, with the aid of the adapter 2556 and/or modem 2558, manage storage provided by the cloud storage system as it would other types of external storage. For instance, the external storage interface 2526 can be configured to provide access to cloud storage sources as if those sources were physically connected to the computer 2502.

The computer 2502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 26 is a schematic block diagram of a sample computing environment 2600 with which the disclosed subject matter can interact. The sample computing environment 2600 includes one or more client(s) 2602. The client(s) 2602 can be hardware and/or software (e.g., threads, processes, computing devices). The sample computing environment 2600 also includes one or more server(s) 2604. The server(s) 2604 can also be hardware and/or software (e.g., threads, processes, computing devices). The servers 2604 can house threads to perform transformations by employing one or more embodiments as described herein, for example. One possible communication between a client 2602 and servers 2604 can be in the form of a data packet adapted to be transmitted between two or more computer processes. The sample computing environment 2600 includes a communication framework 2606 that can be employed to facilitate communications between the client(s) 2602 and the server(s) 2604. The client(s) 2602 are operably connected to one or more client data store(s) 2608 that can be employed to store information local to the client(s) 2602. Similarly, the server(s) 2604 are operably connected to one or more server data store(s) 2610 that can be employed to store information local to the servers 2604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for documenting industrial control systems, comprising:
   a memory that stores executable components; and
   a processor, operatively coupled to the memory, that executes the executable components, the executable components comprising:
      a discovery component configured to deploy, to devices of an industrial control system, discovery agents configured to discover and collect respective sets of information about the devices and networks of the industrial control system; and
      an aggregation component configured to receive the sets of information from the discovery agents and generate, based on the sets of information, a topology model of the industrial control system,
   wherein
      the discovery agents comprise multiple agent types configured to execute respective different discovery strategies for discovering the sets of information,
      the discovery component is configured to, in response to determining that device identity information received from a first discovery agent, of the discovery agents, configured to actively poll a device indicates that the device is an industrial controller, deploy, to the device, a second discovery agent, of the discovery agents, configured to read and report the industrial controller's I/O configuration data, and the aggregation component is configured to update the topology model based on the device identity information and the I/O configuration data.

2. The system of claim 1, wherein the discovery strategies comprise at least passive monitoring of data traffic on a network or active polling of a device for device identity and configuration information.

3. The system of claim 2, wherein the discovery strategies further comprise at least one of
strategies for collecting device identity or configuration data from respective different types of industrial devices or
strategies for collecting network information from respective different types of networks.

4. The system of claim 1, wherein the sets of information comprise at least one of device identity information, device type information, network type information, device configuration settings, I/O configuration data collected from an industrial controller, a network address discovered to be generating data traffic on a network, or data port configuration settings.

5. The system of claim 1, wherein the discovery component is configured to deploy the first discovery agent in response to determining that information received from a third discovery agent configured to passively monitor a plant network identifies a network address of the device on the plant network.

6. The system of claim 1, wherein the discovery component is configured to, in response to determining that information received from a third discovery agent identifies a type of device present in the automation system, deploy a fourth discovery agent configured to poll the type of device for information about the device.

7. The system of claim 1, wherein
the device is a first device, and
the discovery component is configured to, in response to determining that device identity information for a second device received from a third discovery agent, of the discovery agents, indicates that the second device has a data port or data bus that is configured to communicate with a third device, deploy a fourth discovery agent, of the discovery agents, configured to poll the third device for device identity or configuration information.

8. The system of claim 1, wherein the discovery component is configured to orchestrate discovery activities of the discovery agents based on discovery rules that define trigger relationships between the multiple agent types.

9. The system of claim 1, wherein
the system executes on a cloud platform, and
the discovery component is configured to deploy the discovery agents to the devices via an edge device or a network infrastructure device.

10. The system of claim 1, wherein the aggregation component is configured to generate the topology model of the industrial control system based on an aggregation algorithm that defines rules for aggregating the sets of information from different types of device agents into segments of the topology model.

11. A method, comprising:
deploying, by a system comprising a processor, discovery agents to devices of an industrial control system, wherein the discovery agents are configured to discover and collect respective sets of information about the devices and networks of the industrial control system, and the discovery agents comprise multiple agent types configured to execute respective different discovery strategies for discovering the sets of information;
receiving, by the system, the sets of information submitted by the discovery agents; and
generating, by the system based on the sets of information, a topology model of the industrial control system, wherein
the deploying comprises:
deploying a first discovery agent, of the discovery agents, configured to actively poll a device discovered via passive monitoring of a plant network; and
in response to determining that device identity information received from the first discovery agent indicates that the device is an industrial controller, deploying, to the device, a second discovery agent, of the discovery agents, configured to read and report the industrial controller's I/O configuration data, and
the generating comprises updating the topology model based on the device identity information and the I/O configuration data.

12. The method of claim 11, wherein the discovery strategies comprise at least passive monitoring of data traffic on the plant network or active polling of a device for device identity and configuration information.

13. The method of claim 12, wherein the discovery strategies further comprise at least one of
strategies for collecting device identity or configuration data from respective different types of industrial devices or
strategies for collecting network information from respective different types of networks.

14. The method of claim 11, wherein the sets of information comprise at least one of device identity information, device type information, network type information, device configuration settings, I/O configuration data collected from an industrial controller, a network address discovered to be generating data traffic on a network, or data port configuration settings.

15. The method of claim 11, wherein the deploying further comprises deploying the first discovery agent in response to determining that information received from a third discovery agent that performs the passive monitoring of the plant network identifies a network address of the device on the plant network.

16. The method of claim 11, wherein the deploying further comprises, in response to determining that information received from a third discovery agent identifies a type of a device present in the industrial control system, deploying a fourth discovery agent configured to poll the type of device for information about the device.

17. The method of claim 11, wherein
the device is a first device, and
the deploying further comprises, in response to determining that device identity information for a second device received from a third discovery agent, of the discovery agents, indicates that the second device has a data port or data bus that is configured to communicate with a third device, deploying a fourth discovery agent, of the discovery agents, configured to poll the third device for device identity or configuration information.

18. The method of claim 11, wherein the deploying further comprises orchestrating discovery activities of the discovery agents based on discovery rules that define trigger relationships between the multiple agent types.

19. A non-transitory computer-readable medium having stored thereon instructions that, in response to execution, cause a system comprising a processor to perform operations, the operations comprising:

deploying discovery agents to devices of an industrial control system, wherein the discovery agents are configured to discover and collect respective sets of information about the devices and networks of the industrial control system, and the discovery agents comprise multiple agent types configured to execute respective different discovery strategies for discovering the sets of information;

receiving the sets of information submitted by the discovery agents; and generating a topology model of the industrial control system based on the sets of information, wherein the deploying comprises:

deploying a first discovery agent, of the discovery agents, configured to actively poll a device discovered via passive monitoring of a plant network; and in response to determining that device identity information received from the first discovery agent indicates that the device is an industrial controller, deploying, to the device, a second discovery agent, of the discovery agents, configured to read and report the industrial controller's I/O configuration data, and the generating comprises updating the topology model based on the device identity information and the I/O configuration data.

20. The non-transitory computer-readable medium of claim 19, wherein the discovery strategies comprise at least passive monitoring of data traffic on a network or active polling of a device for device identity and configuration information.

* * * * *